United States Patent
Imhof et al.

(10) Patent No.: US 10,110,002 B2
(45) Date of Patent: *Oct. 23, 2018

(54) AUTOMATED DEMAND RESPONSE SYSTEM

(71) Applicant: Siemens Industry, Inc., Alpharetta, GA (US)

(72) Inventors: Raphael Imhof, Palatine, IL (US); Pornsak Songkakul, Mequon, WI (US); Michael J. Marchi, Algonquin, IL (US); Thomas Rule, Arlington Heights, IL (US); Paula Hiller, Island Lake, IL (US); Florian Ersch, Monmouth Junction, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 354 days.

This patent is subject to a terminal disclaimer.

(21) Appl. No.: 14/989,393

(22) Filed: Jan. 6, 2016

(65) Prior Publication Data

US 2016/0118790 A1   Apr. 28, 2016

Related U.S. Application Data

(63) Continuation of application No. 13/163,143, filed on Jun. 17, 2011, now Pat. No. 9,310,786.

(51) Int. Cl.
*H02J 3/00* (2006.01)
*G05B 15/02* (2006.01)

(52) U.S. Cl.
CPC ............... *H02J 3/00* (2013.01); *G05B 15/02* (2013.01); *G05B 2219/2642* (2013.01)

(58) Field of Classification Search
CPC combination set(s) only.
See application file for complete search history.

(56) References Cited

U.S. PATENT DOCUMENTS 5,168,170 A * 12/1992 Hartig ..................... H02J 3/14
307/34
5,544,036 A   8/1996 Brown
(Continued)

FOREIGN PATENT DOCUMENTS

| CN | 1655415 A | 8/2005 |
| CN | 101939891 A | 1/2011 |
| WO | 2010088663 A1 | 8/2010 |

OTHER PUBLICATIONS

Cisco Systems Inc., "Case Study—Enterprise Automates Utility Demand Response", 2009, Retrieved from the Internet at "www.Cisco.com", 4 pages.

(Continued)

*Primary Examiner* — Mamadou Diallo

(57) ABSTRACT

A system and method for reducing an electrical load in a facility with a building automation system, includes first receiving information for a demand response event from an automated demand response server at an automated demand response client. After receipt of a new demand response event, the system determines a plurality of devices of the building automation system to be controlled during the demand response event. Next, the system prepares a schedule of control actions for the plurality of devices during the demand response event. The system then sends control messages to the building automation system to execute the control actions for the plurality of devices according to the schedule of control actions for the demand response event.

20 Claims, 17 Drawing Sheets

(56) References Cited

U.S. PATENT DOCUMENTS

| | | |
|---|---|---|
| 5,640,153 A | 6/1997 | Hildebrand et al. |
| 5,761,083 A | 6/1998 | Brown |
| 7,062,360 B2 | 6/2006 | Fairlie |
| 7,660,649 B1 | 2/2010 | Hope |
| 8,078,330 B2 | 12/2011 | Brickfield et al. |
| 8,428,782 B2 | 4/2013 | Imes |
| 8,862,280 B1 | 10/2014 | Dyess |
| 8,946,924 B2 | 2/2015 | Pessina |
| 2002/0082748 A1 | 6/2002 | Enga et al. |
| 2003/0040844 A1 | 2/2003 | Spool et al. |
| 2003/0041037 A1 | 2/2003 | Spool et al. |
| 2003/0171851 A1 | 9/2003 | Brickfield et al. |
| 2004/0213384 A1* | 10/2004 | Alles ............... H04L 12/2803 |
| | | 379/70 |
| 2004/0225649 A1 | 11/2004 | Yeo et al. |
| 2005/0038571 A1 | 2/2005 | Brickfield et al. |
| 2005/0043862 A1 | 2/2005 | Brickfield et al. |
| 2007/0255461 A1 | 11/2007 | Brickfield et al. |
| 2008/0167756 A1 | 7/2008 | Golden et al. |
| 2008/0172312 A1 | 7/2008 | Synesiou et al. |
| 2008/0177423 A1 | 7/2008 | Brickfield et al. |
| 2009/0187499 A1 | 7/2009 | Mulder et al. |
| 2010/0017045 A1 | 1/2010 | Nesler et al. |
| 2010/0088261 A1 | 4/2010 | Montalvo |
| 2010/0106641 A1 | 4/2010 | Chassin et al. |
| 2010/0107173 A1 | 4/2010 | Chassin |
| 2010/0114387 A1 | 5/2010 | Chassin |
| 2010/0324962 A1 | 12/2010 | Nesler et al. |
| 2010/0332373 A1 | 12/2010 | Crabtree et al. |
| 2011/0004358 A1 | 1/2011 | Pollack et al. |
| 2011/0006887 A1 | 1/2011 | Shaull et al. |
| 2011/0016200 A1 | 1/2011 | Koch |
| 2011/0029139 A1 | 2/2011 | Altonen et al. |
| 2011/0031806 A1 | 2/2011 | Altonen et al. |
| 2011/0035061 A1 | 2/2011 | Altonen et al. |
| 2011/0046792 A1 | 2/2011 | Imes et al. |
| 2011/0047418 A1 | 2/2011 | Drees et al. |
| 2011/0061015 A1 | 3/2011 | Drees et al. |
| 2011/0066300 A1 | 3/2011 | Tyagi et al. |
| 2011/0133655 A1 | 6/2011 | Recker et al. |
| 2011/0178977 A1 | 7/2011 | Drees |
| 2011/0202185 A1 | 8/2011 | Imes et al. |
| 2011/0204720 A1 | 8/2011 | Ruiz et al. |
| 2011/0288672 A1 | 11/2011 | Cunney et al. |
| 2012/0001487 A1 | 1/2012 | Pessina |
| 2012/0004786 A1 | 1/2012 | Lo et al. |
| 2012/0022700 A1 | 1/2012 | Drees et al. |
| 2012/0046859 A1 | 2/2012 | Imes et al. |
| 2012/0065805 A1 | 3/2012 | Montalvo |
| 2012/0091804 A1 | 4/2012 | Altonen et al. |
| 2012/0095601 A1 | 4/2012 | Abraham et al. |
| 2012/0143385 A1 | 6/2012 | Goldsmith |
| 2012/0221162 A1 | 8/2012 | Forbes |
| 2012/0232701 A1 | 9/2012 | Carty et al. |
| 2012/0239218 A1 | 9/2012 | Forbes |
| 2012/0259583 A1 | 10/2012 | Noboa et al. |
| 2012/0262093 A1 | 10/2012 | Recker et al. |
| 2012/0265355 A1* | 10/2012 | Bernheim ............ G05B 15/02 |
| | | 700/286 |
| 2012/0271686 A1 | 10/2012 | Silverman |
| 2012/0323382 A1 | 12/2012 | Kamel et al. |
| 2013/0013121 A1 | 1/2013 | Henze et al. |
| 2013/0035992 A1 | 2/2013 | Silverman |
| 2013/0113284 A1* | 5/2013 | Altonen ................ H02J 3/12 |
| | | 307/31 |
| 2015/0019032 A1 | 1/2015 | Koch et al. |

OTHER PUBLICATIONS

Kiliccote et al., "Northwest Open Automated Demand Response Technology Demonstration Project", Apr. 2009, Ernest Orlando Lawrence Berkeley National Laboratory, 44 pages.

Auslander et al., "A Distributed Intelligent Automated Demand Response Building Management System", Aug. 18, 2009, Department of Energy Funding Opportunity No. DE-FOA-000115, 69 pages.

Siemens Industry, Inc., Enrolling with a Demand Response Aggregator—Curtail load with less risk and larger incentive payments, 2011, Retrieved from the Internet at "www.usa.siemens.com/buildingtechnologies", 4 pages.

Motegi et al., "Introduction to Commercial Building Control Strategies and Techniques for Demand Response", May 2007, Ernest Orlando Lawrence Berkeley National Laboratory, Report No. LBNL-59975, 76 pages.

Piette et al., "Findings from the 2004 Fully Automated Demand Response Tests in Large Facilities", Sep. 2005, Ernest Orlando Lawrence Berkeley Nations Laboratory, Report No. LBNL-58178, 197 pages.

Piette et al.,"Open Automated Demand Response Communications Specification (Version 1.0)", PIER Program, Apr. 2009,Lawrence Berkeley National Laboratory, CEC-500-2009-063, 214 pages.

\* cited by examiner

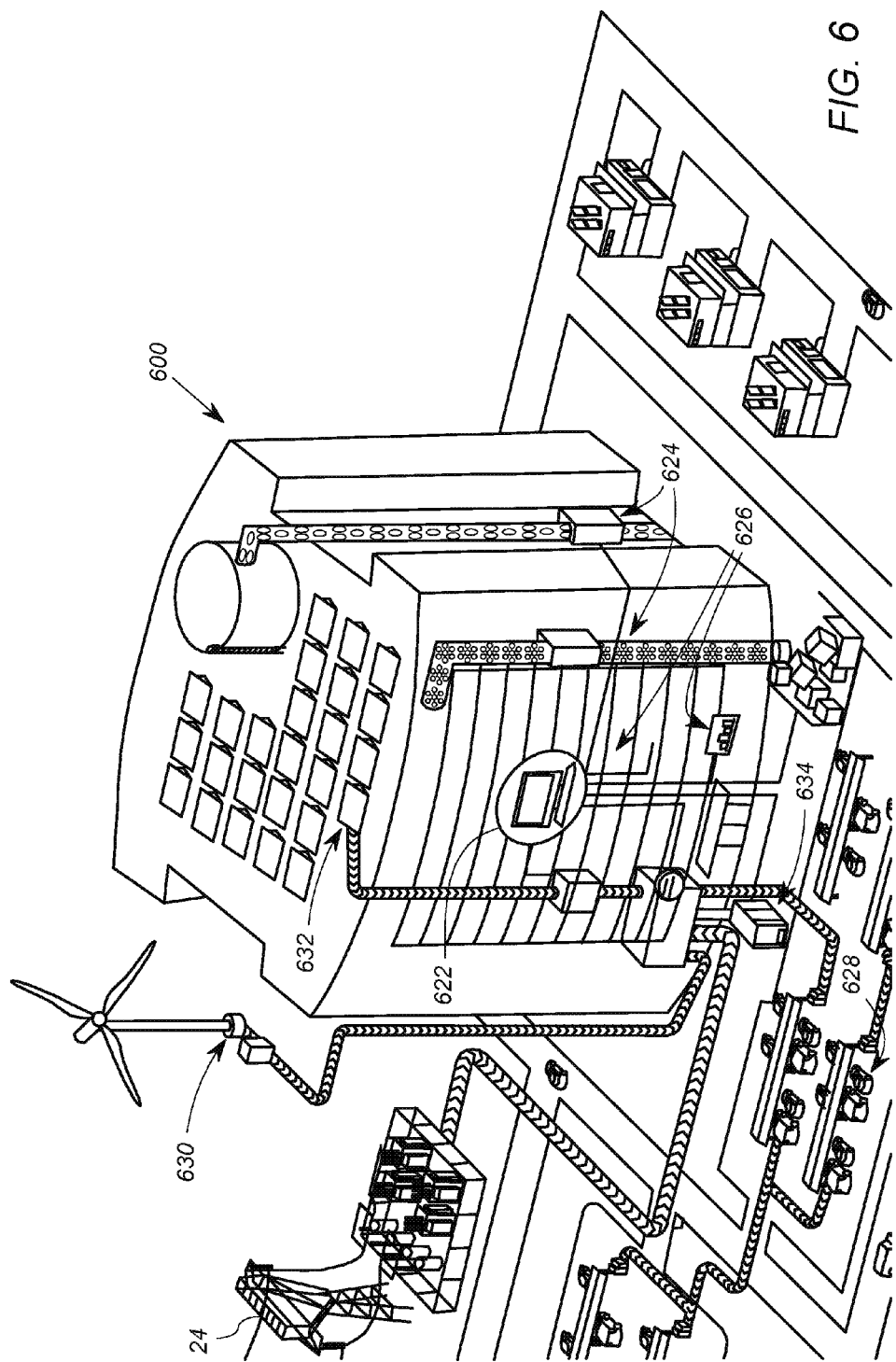

| 700 → System | % of total | Normal KW | % of total | DR L1 KW 200 | % of total | DR L2 KW 400 | % of total | DR L3 KW 600 |
|---|---|---|---|---|---|---|---|---|
| Target DR Reduction | | | | | | | | |
| | | - system expect to run at 90% capacity during the hottest peak day from 12 p.m. to 1 p.m.<br>- wind mill running at full capacity<br>- solar PV at peak capacity (bright summer day)<br>- 30 e-cars are in the charging mode with 4 kw demand for each e-car | | - reset temperature by 3 deg F (1 hour before DR event start time) (resulting cooling load reduction by 10%)<br>- dim light by 20% (5-10 minutes before DR event start time)<br>- stop all the car charging (5 minutes before DR start time | | - reset temperature by 6 deg F (1 hour before DR event start time)<br>- dim light by 30% (5-10 minutes before DR event start time)<br>- stop all the car charging (5 minutes before DR Start time) | | - reset temperature by 6 deg F (1 hour before DR event start time)<br>- dim light by 40% 5-10 minutes before DR event start time)<br>- stop all the car charging (5 minutes before DR event start time |
| Cooling Plant | 42.25% | 783 | 43.33% | 638 | 39.29% | 514 | 40.53% | 514 |
| Air Plant (1/3 of cooling plant) | 14.15% | 254 | 17.27% | 254 | 19.44% | 254 | 20.05% | 254 |
| Lighting | 22.26% | 400 | 21.73% | 320 | 21.40% | 280 | 18.92% | 240 |
| Plugged load | 5.56% | 100 | 6.79% | 100 | 7.64% | 100 | 7.88% | 100 |
| Misc electrical + data center | 8.80% | 160 | 10.87% | 160 | 12.23% | 160 | 12.61% | 160 |
| E-Car (30 compact car @ 4 kw | 6.68% | 120 | 0.00% | 0 | 0.00% | 0 | 0.00% | 0 |
| Total Consumption | | 1797 | | 1472 | | 1308 | | 1268 |
| Generator | 0.00% | 0 | 0.00% | 0 | 0.00% | 0 | 15.77% | 200 |
| PV | 10.01% | 180 | 12.23% | 180 | 13.76% | 180 | 14.16% | 180 |
| Wind Turbine | 2.78% | 50 | 3.40% | 50 | 3.82% | 50 | 3.94% | 50 |
| Car (Reverse feed) | 0.00% | 0 | 0.00% | 0 | 0.00% | 0 | 2.37% | 30 |
| Total production | 12.80% | 230 | 15.62% | 230 | 17.58% | 230 | 36.27% | 460 |
| Net purchase from the grid | 87.20% | 1567 | 84.38% | 1242 | 82.42% | 1078 | 63.73% | 808 |
| Net kw reduction due to DR Action | | | | 325 | | 489 | | 759 |

FIG. 7

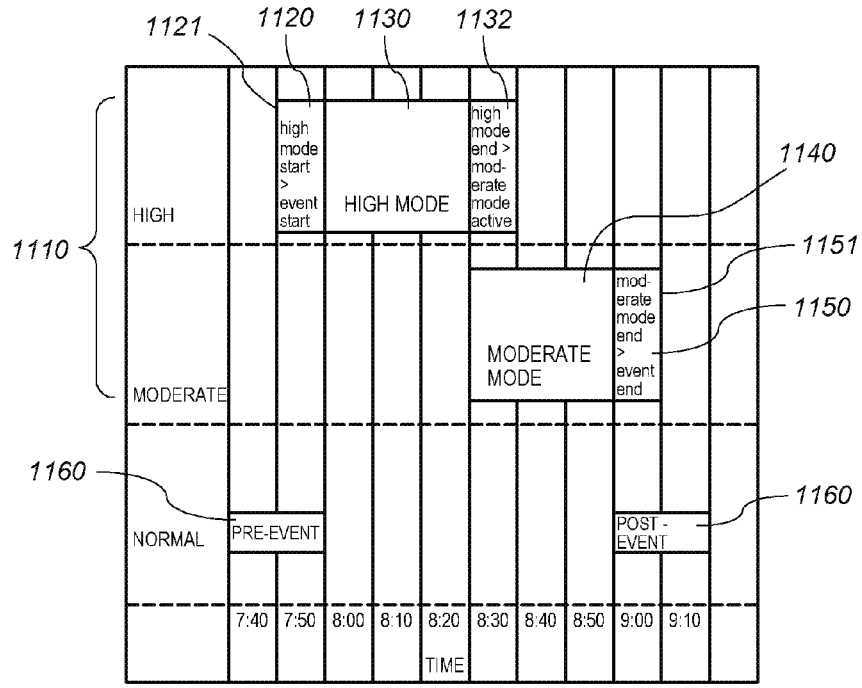
FIG. 11A
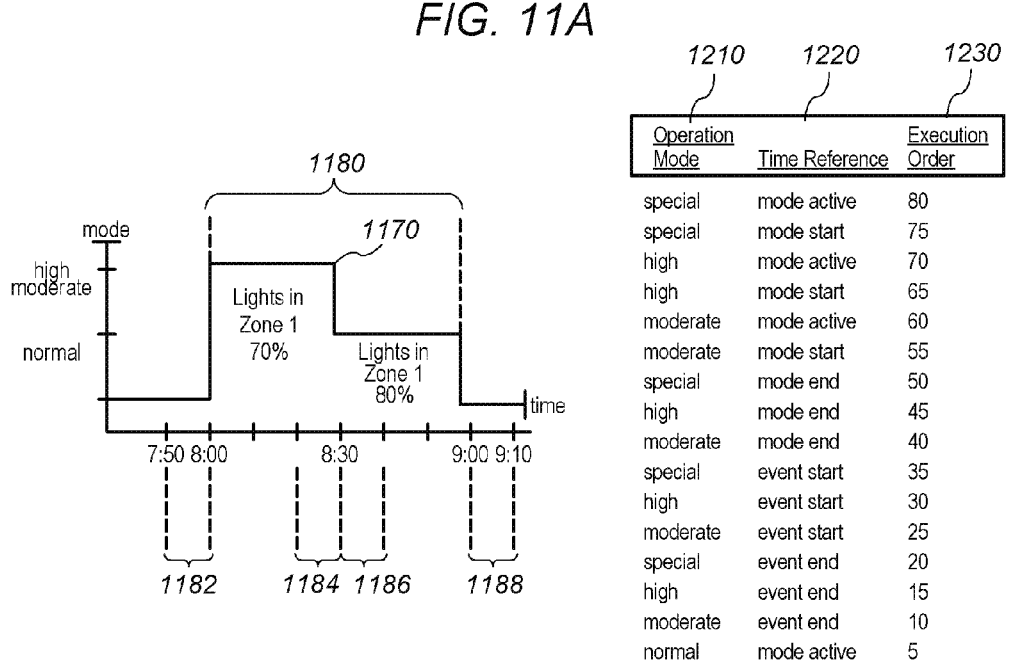
FIG. 11B
FIG. 12

AUTOMATED DEMAND RESPONSE SYSTEM

This application is a continuation of U.S. patent application Ser. No. 13/163,143, filed Jun. 17, 2011, which is incorporated herein by reference.

FIELD

This application relates to the field of energy consumption management, and particularly to the automated handling of demand response requests from energy providers.

BACKGROUND

Utility companies, including electrical power producers are often in a situation where it would be advantageous to reduce demand for electrical power ("kW demand") by customers ("end users"). In particular, in times of peak demand it is advantageous to reduce overall energy consumption and therefore reduce the burden on the electrical power generators that provide power to the electrical power grid. When overall energy consumption is sufficiently reduced during times of peak demand, the electrical power grid may be stabilized such that electrical power may be reliably supplied to end users, thereby avoiding brownouts or possibly blackouts.

In order to limit energy consumption during times of peak demand, electrical utilities have traditionally increased the price for electricity during the times when it is known that electrical energy demand will be high. The hope is that the increased price for electricity during these times of high demand will cause end users to limit electrical energy consumption, and therefore avoid overloading the electrical power grid during the times of peak demand. However, electrical utilities have discovered that merely raising the price of electricity during the times of high demand is often insufficient to avoid excessive demand. Therefore, additional systems and initiatives have been developed to encourage end users to shed electrical loads during times of high demand.

Demand Response ("DR") agreements have been used by energy providers to request electrical load shedding. With Demand Response agreements, the electric energy provider contacts certain end users during certain Demand Response events that are associated with times of peak demand. In exchange for load shedding during these Demand Response events, the end user is given certain price breaks. The Demand Response agreements benefit the electric energy provider by reduced energy consumption during times of high demand, and also benefit the end user through energy price reductions.

Communications from the electric energy provider to the end user indicating that a Demand Response event would occur in the near future were initially in the form of telephone calls or emails. After receiving such telephone calls or emails, the end user would take the appropriate action to reduce energy consumption under the Demand Response agreement. For example, during a DR event in hot weather, a building operator may temporarily increase the thermostat temperature, dim the lights, increase refrigerator temperature, or take other action to reduce energy consumption during the Demand Response event. This action typically occurred manually by an individual making the appropriate adjustments to various building control systems.

With more modern systems, Demand Response events are typically communicated to the end user automatically by computers using a client-server model. In particular, a DR server at the electric energy provider communicates Demand Response events to a DR client at the premises of the end user. The DR server may push data concerning the Demand Response event to the DR client, or the DR client may poll the DR server for data concerning Demand Response events. Various protocols exist for communicating DR signals between the DR server and the DR client. One such protocol is the OpenADR (Open Automated Demand Response Communication Specification Version 1.0) protocol developed by Lawrence Berkeley National Lab and Akuacom. OpenADR has been adopted by California utilities and could become a national standard for communicating Demand Response signals. Under current Demand Response systems, when a DR client receives a DR event message providing information concerning a Demand Response event from a DR server, the DR event message is passed on to an individual or system responsible to take corresponding load shedding actions.

While past Demand Response systems have been helpful in reducing energy consumption during periods of high demand, it would be advantageous to improve upon these systems. In particular, it would be advantageous to provide a Demand Response system that is automated and efficiently reduces electrical energy consumption in a facility during various DR events based on user configured strategies for responding to the DR messages.

SUMMARY

In accordance with one embodiment of the disclosure, there is provided a method of reducing an electrical load in a facility with a building automation system. The method includes receiving information for a demand response event and then determining a plurality of devices of the building automation system to be controlled during the demand response event. The method further includes preparing a schedule of control actions for the plurality of devices during the demand response event. In addition, the method includes sending control messages to the building automation system to execute the control actions for the plurality of devices according to the schedule of control actions for the demand response event.

In at least one embodiment, the method further includes reviewing the schedule of control actions to determine if a conflict exists in the schedule for control actions related to one of the plurality of devices. If the conflict exists in the schedule, the method further comprises resolving the conflict in the schedule based on a priority execution order for the control action, wherein the priority execution order is related to a demand response control period for the control action. The demand response control periods may include a demand response control period occurring during the demand response event, a demand response control period occurring before the demand response event, or a demand response control period occurring after the demand response event.

In at least one embodiment of the disclosure, a system is disclosed for reducing the electrical load in a building. The system includes a building automation system (BAS) having a plurality of field panels configured to deliver control instructions to a plurality of devices in the building. The system also comprises an automated demand response client configured to receive demand response event message from an automated demand response server. The automated demand response client includes a scheduler component and a BAS communications component. The scheduler component is configured to prepare a schedule of control actions for the plurality of devices during the demand response event. The BAS communications component is configured to deliver the control actions for the plurality of devices to the plurality of BAS field panels according to the schedule.

In at least one embodiment, the system includes a graphical user interface configured to display information related to actual energy consumption of the facility during the demand response event. The graphical user interface may also be configured to display a graph showing demand response events and a plurality of demand response modes associated with the demand response events during a selected period of time.

In at least one additional embodiment of the disclosure, a computer-readable medium contains instructions for controlling a computer system to generate instructions for controlling a building automation system. The computer readable medium includes instructions for controlling the computer system by causing the computer system to receive information for a demand response event from an automated demand response server. The instructions also cause the computer system to determine a plurality of devices of the building automation system to be controlled during the demand response event and preparing a schedule of control actions for the plurality of devices during the demand response event. In addition, the instructions cause the computer system to send control messages to the building automation system to execute the control actions for the plurality of devices according to the schedule of control actions for the demand response event.

The above described systems, methods, features and advantages of the present invention, as well as others, will become more readily apparent to those of ordinary skill in the art by reference to the following detailed description and accompanying drawings. While it would be desirable to provide an automated Demand Response system that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 6 shows an illustration of an exemplary building including a building control system configured to receive communications from the ADR application client of FIG. 5;

FIG. 7 shows an exemplary spreadsheet of a strategy for responding to various demand response events using the automated demand response client of FIG. 5;

FIG. 11A shows an illustration of an exemplary demand response event processed by the ADR client application in accordance with the present invention, where the demand response event specifies multiple DR commands and the ADR client has identified potential conflicting control actions for a point to be controlled in response the DR commands;

FIG. 11B shows the exemplary demand response event of FIG. 11A as a step function reflecting the resolution by the ADR client application in accordance with the present invention of the conflicting control actions;

FIG. 12 shows a chart of execution order priorities for solving conflicts of different DR modes and different DR events by the ADR client application in FIG. 5;

DESCRIPTION

Figure 1:
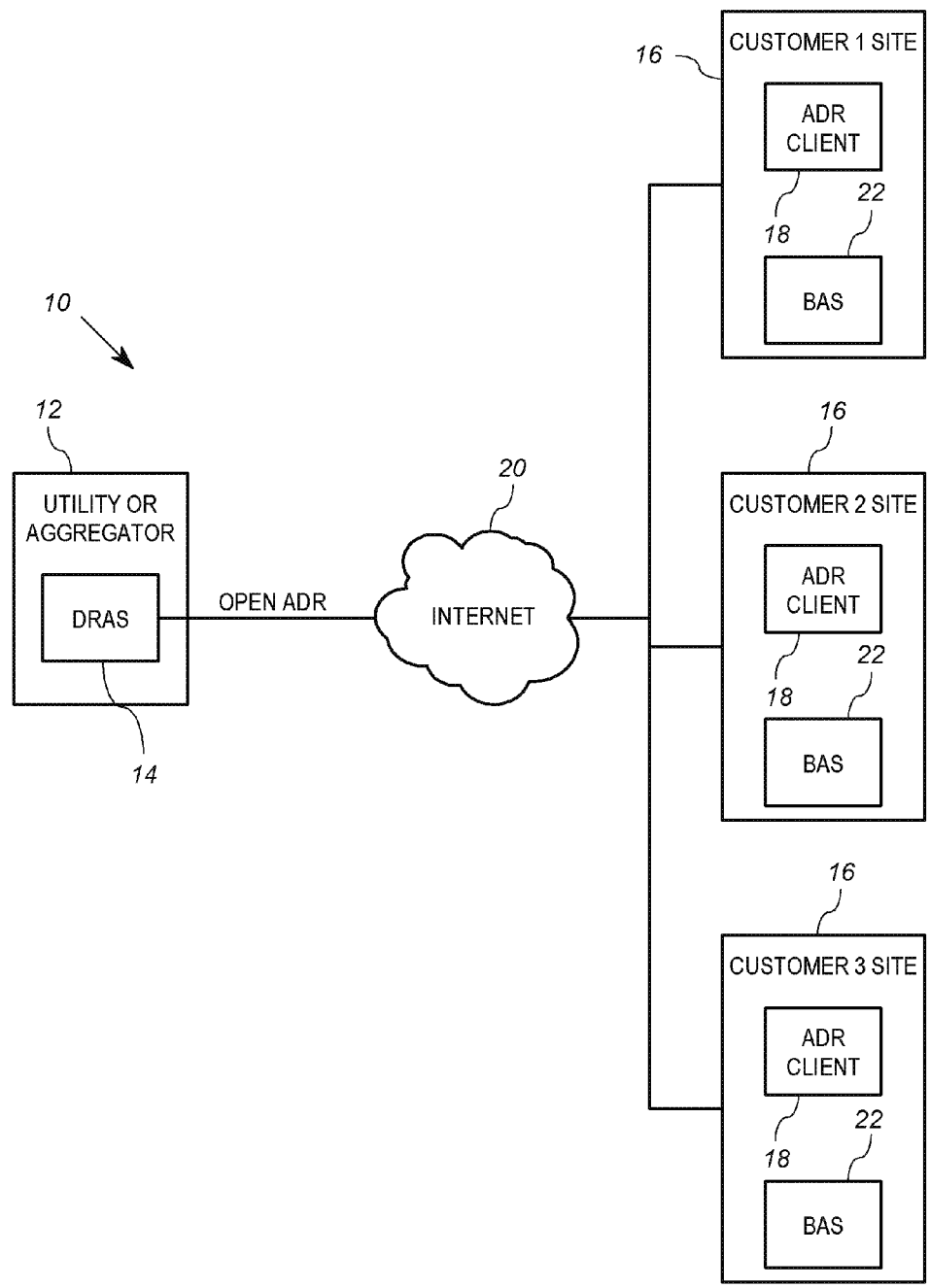
FIG. 1 shows a block diagram of an exemplary automated demand response system including an automated demand response server (also referenced herein as a "Demand Response Automation Server" or DRAS) and a plurality of automated demand response clients.

With reference to FIG. 1, a high level block diagram of an exemplary automated demand response system 10 is shown. The system 10 includes a demand response automation server computer ("DRAS" or "DR Server") 14 located on the premises of an electrical utility or aggregator 12, and a plurality of automated demand response client computers ("ADR clients") 18 located at various customer sites 16. Each ADR client 18 is coupled to a building automation system (BAS) 22 which is configured to control various building environment and safety devices, such as lights, thermostats in HAVC systems, refrigeration systems, and fire alarm systems at the customer site 16. The DRAS 14 and the ADR client 18 are each equipped with communication capabilities and may be communicatively coupled to a communications network 20, such as the Internet, thus allowing communications to flow between the DRAS 14 and the ADR clients 18.

While the DRAS 14 or the ADR clients 16 may each comprise a full-sized personal computer, it will be understood that the system and method may also be used in connection with mobile devices capable of wirelessly exchanging data with a server over a network such as the Internet. In any event, the DR server 14 and the ADR client 18 are configured for the electrical utility company and each end user to comply with a standard Demand Response communication protocol, such as OpenADR. Additionally, while the DRAS 14 and the ADR clients 18 are shown in the embodiment of FIG. 1 as being located on the premises of the electrical utility 12 or customer sites 16, it will be recognized that in other embodiments, the DRAS 14 and ADR clients 18 may be located at remote locations from the premises of the electrical utility 12 and the customer sites 16. In such embodiments, the DRAS 14 and ADR clients 18 are typically configured to communicate with other computers or devices at the electrical utility site 12 or the customer sites 16 via the communications network 20.

Figure 2:
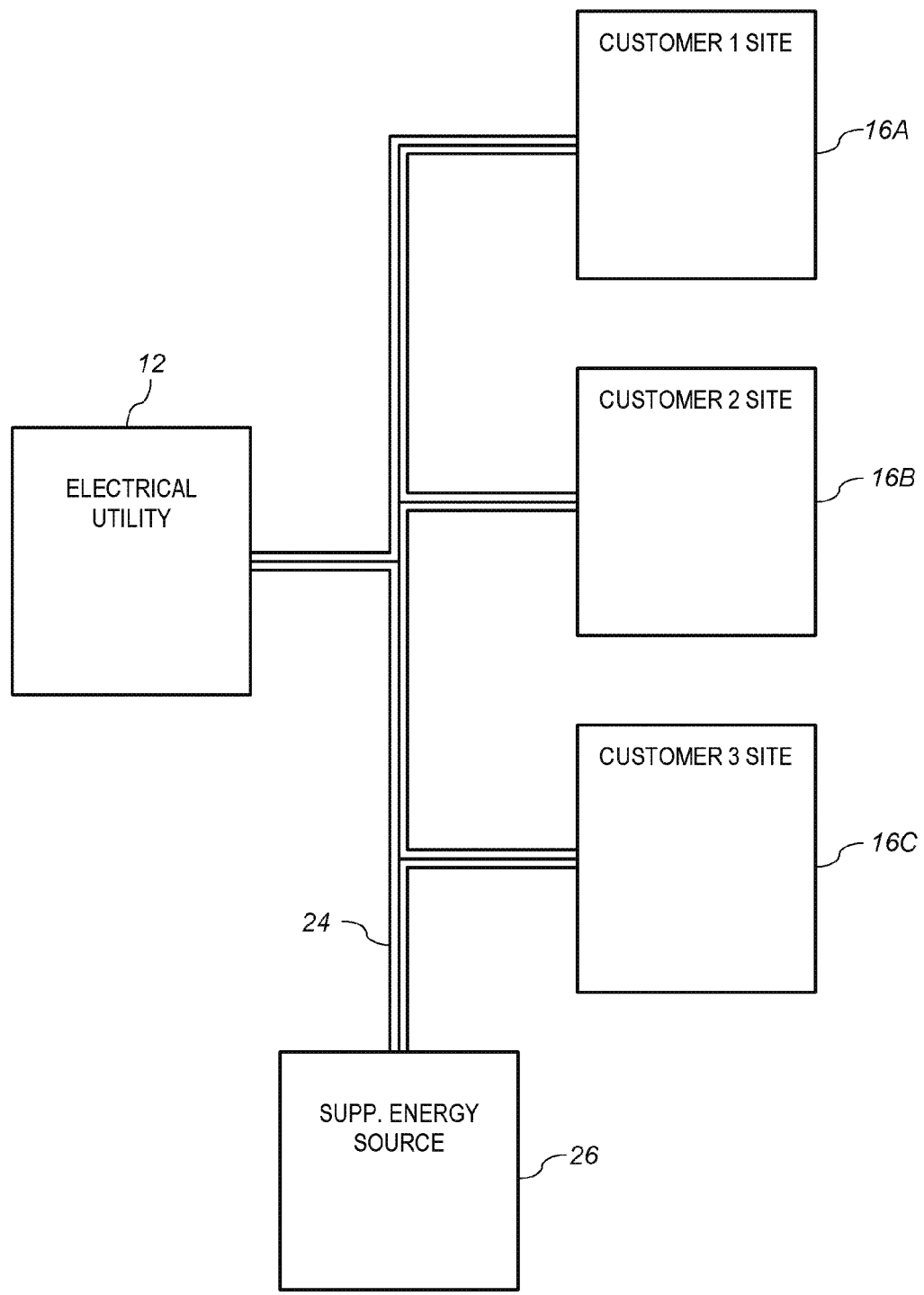
FIG. 2 shows a block diagram of an electrical grid connecting an electrical utility operating the automated demand response server of FIG. 1 with a plurality of end users operating automated demand response clients.

With reference now to FIG. 2, in an exemplary embodiment, an electrical utility 12, who is an operator or affiliate of the operator of the DRAS 14, may supply electrical power over a power grid 24 to end users 16A, 16B, 16C, who are customers of, and consume electrical power supplied over the grid 30 by the utility company 12. At least some of the electrical power consumed by each end user 16 is used to power devices controlled by the BAS system 22 of the end user 16. Supplemental energy sources 26 may also be connected to the power grid 24. These supplemental energy sources 26 may be controlled, for example, by the end users 16 to generate and supply supplemental electrical power to the electrical grid 24.

The end users 16 are typically commercial or industrial entities, such as shopping malls or factories having a kW demand that is sufficiently large to participate in traditional Demand Reduction programs. The end users 16 may also be an aggregation of residential or commercial units (e.g., an apartment complexes or commercial units in a shopping mall) having an aggregate KW demand that is relatively large. However, in other embodiments, it will be appreciated that the end users 16 could even be residential units having BAS systems 22 that automate control of various environment control devices in the home or other residence. Such BAS systems are becoming more common in residences. Thus, because the Demand Response system 10 is fully automated, as explained in further detail below, a homeowner or other residential customer could easily include an ADR client 18 in the residence and participate in the Demand Response system 10 as explained herein.

DRAS

Figure 3:
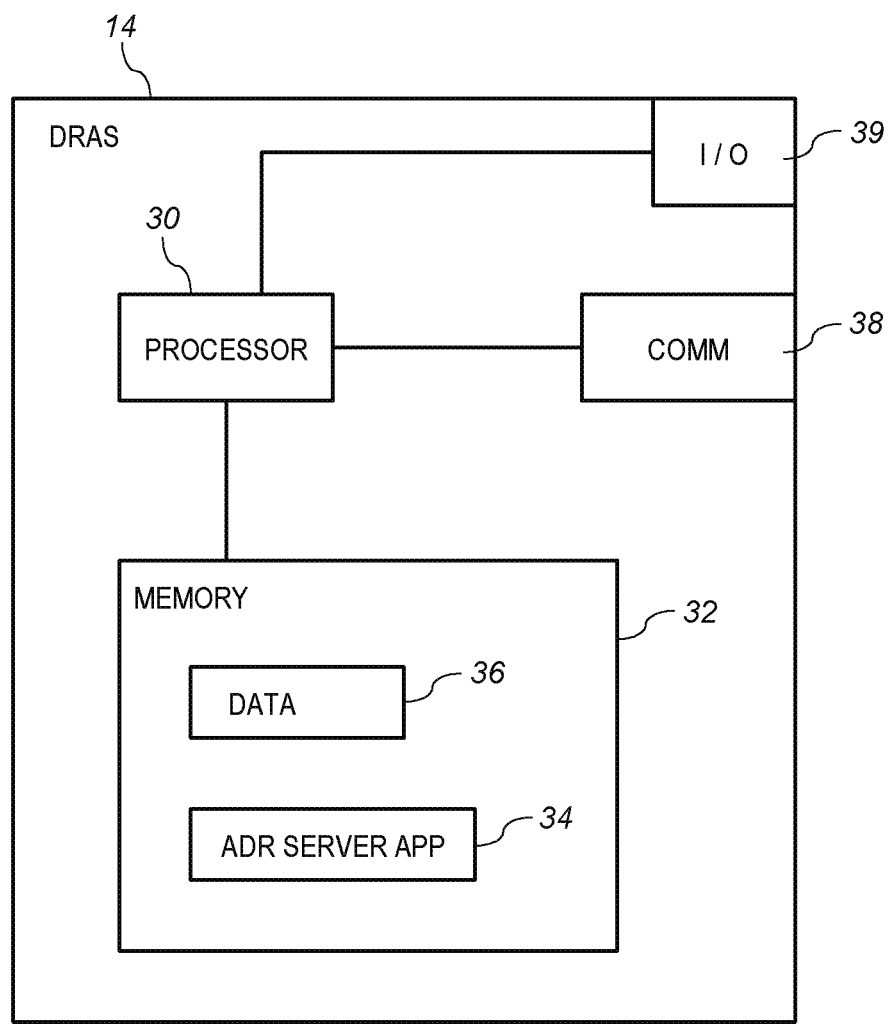
FIG. 3 shows a block diagram of the automated demand response server of FIG. 1 including a DRAS application retained in memory.

With reference now to FIG. 3, in one exemplary embodiment, the DRAS 14 may include a processor 30, a memory 32, a communications network interface device 38, I/O ports 39, and other components typically present in a general purpose computer. The memory 32 stores information accessible by the processor 30, including data 36 that may be retrieved, manipulated or stored by the processor 30, and a DRAS app 34 configured to process DR event information and generate DR messages. The memory 32 may be of any type capable of storing information accessible by the processor, such as a hard-drive, memory card, ROM, RAM, DVD, CD-ROM, write-capable, read-only memories, or other computer-readable medium. The processor 30 may be any well-known processor, such as processors from Intel Corporation or AMD. Alternatively, the processor 30 may be implemented in combination with the DRAS application 34 and/or other logic in a dedicated controller such as an Application Specific Integrated Circuit ("ASIC"). The processor 30 is configured to retrieve, store or modify data in accordance with the DRAS application 34 in the memory 32. The data 36 may be stored in computer registers, in a relational database as a table having a plurality of different fields and records, XML documents, or flat files. The data 36 may also be formatted in any computer-readable format such as, but not limited to, binary values, ASCII or Unicode.

Although the block diagram of FIG. 3 illustrates the processor 30 and memory 32 as being within two distinct blocks, it will be understood by those of ordinary skill in the art that the processor and memory may actually comprise multiple processors and memories that may or may not be stored within the same physical housing. For example, some of the data 36 may be stored on removable CD-ROM and others within a read-only computer chip. Some or all of the data 36 may be stored in a location physically remote from, yet still accessible by, the processor. Similarly, the processor may actually comprise a collection of processors which may or may not operate in parallel.

The communications network interface device 38 is capable of establishing wired or wireless communication links with other devices over a communication network, such as the network 20. The network 20 may be any wired or wireless communications network, such as the Internet, a WLAN, a LAN, or other communication network system. The communications network interface device 38 of the DRAS 14 communicates with the other devices in the network, and particularly the ADR clients 18 using a predetermined protocol. In at least one embodiment, the communications network interface device 38 of the DRAS 14 uses the OpenADR (Open Automated Demand Response) protocol developed by Lawrence Berkeley National Lab.

With continued reference to FIG. 3, the data 36 in the memory 32 of the DRAS 14 includes information for determining whether data included or derived from a message, such as an XML document or in SOAP packets, received at the DR server 14 from an authorized entity (e.g., a manager of the electrical utility) over a communication network 20, corresponds to a request to inform the ADR clients 18 that a DR event will occur. Accordingly, the data 36 in memory 32 provides the processor 30 with sufficient information to determine, from the received, electronic message data, the details of the DR event, such as the start time, stop time and each mode for the DR event. The modes for the DR events indicate different urgency levels or operating levels requested for the DR event. For example, the modes for a DR event may be a "moderate" mode, a "high" mode, or a "special" mode (e.g., an "extreme" mode) or any serial combination of these modes. Each mode for a DR event (also referred to herein as a "DR mode") is communicated in one or more DR event messages 99 from the DRAS 14 over the network 20 via the network communications interface 38. Communication of a DR event will also include a time and date for the DR event.

The DRAS application 34 is configured to detect receipt of electronic message data, such as XML documents or in a SOAP packet, at the communications device 108 transmitted over the network 20 from an electrical utility company, process the electronic message data, determine a DR event indicated by the electronic message data, and also the details of the DR event, such as the timing and one or more modes of the DR event, included in the electronic message data. The DRAS application 34 is then configured to generate a DR event message corresponding to the DR event to the ADR clients 18.

In addition, the DRAS application 34 may be further configured to monitor data received over the network 20 from ADR clients 16 and also from other sources, such as third party weather data sources, and to store the data in the memory 32.

ADR Client

Figure 4:
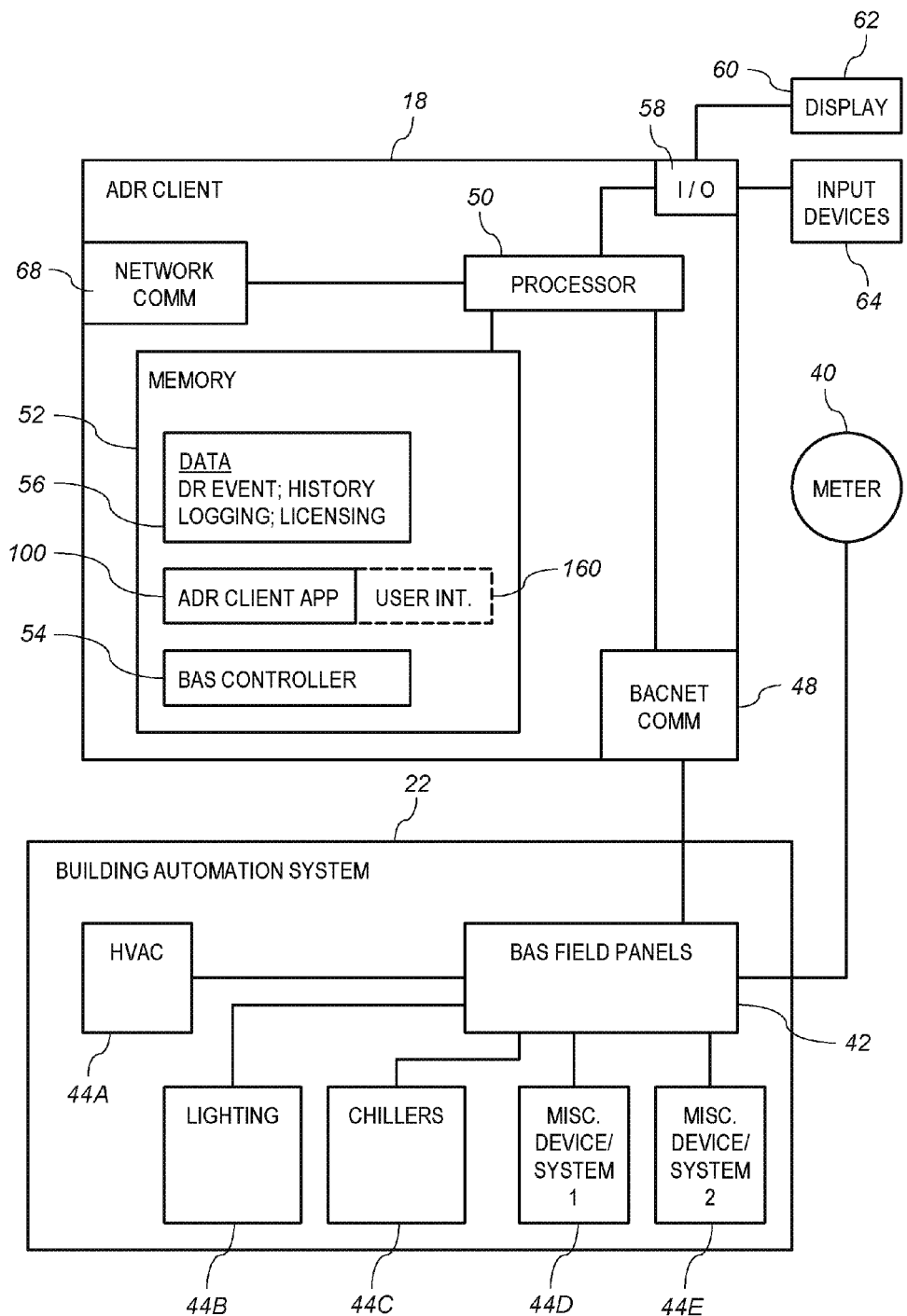
FIG. 4 shows a block diagram of one of the automated demand response clients of FIG. 1 in communication with a building automation system, the automated demand response client including an ADR client application retained in memory for execution by a processor.

With reference now to FIG. 4, each end user 16 includes an ADR client 18 which is electrically and/or communicatively connected to a building automation system 22. The ADR client 18 may also be electrically and/or communicatively connected to an electrical power consumption meter 40 either directly or via the BAS 22. The ADR client 18 may be configured with a processor 50 and a memory 52. The ADR client 18 may be a personal computer or workstation, intended for use by a person, that is configured for specialized operation as a demand response interface to a BAS 22. In the embodiment shown in FIG. 4, the ADR client 18 has all of the internal components normally found in a computer workstation, such as a central processing unit (CPU) 50, a user interface 60 including a display device 62 (such as a monitor) and user input devices 64 (such as a mouse, keyboard, touch-screen, microphone, speakers), CD/DVD drive (part of memory 52 in FIG. 4), and a network communications interface device 68. In at least one embodiment as described herein, the ADR client 18 is provided by the same computer workstation used to execute control programs for the building automation system 22. In other embodiments, the workstation used to provide the ADR client 18 may be a separate workstation that is connected via a network to a workstation used to execute the control programs for the building automation system.

The user interface 60 communicates with the processor 50 through various input/output ports 58 and related interfaces. The memory 52 may be of any type of memory capable of storing information accessible by the processor, such as a hard-drive, memory card, ROM, RAM, DVD, CD-ROM, write-capable, read-only memories, or other computer-readable medium. The information contained in the memory 52 includes instructions 54, 100 and data 56. The user input devices 64 serves as an interface that permits a human ("operator" or "end-user") to modify the data in the memory 52.

The memory 52 of the ADR client 18 includes various programs that may be executed by the processor 50. In particular, the memory 52 includes a BAS controller program 54 configured to send instructions to the field panels 42 of the BAS 22 in order to control and monitor various devices 44 of the BAS 22. In one embodiment, the BAS controller program 54 may be provided by the APOGEE® INSIGHT BAS control software commercially available from Siemens Industry, Inc. or another BAS control software.

In addition to the BAS controller program 54, the memory 52 also includes a program identified in FIG. 4 as the "ADR Client App" 100 (which may also be referenced herein as the "ADR application"). The ADR Client App 100 is configured to receive DR messages from the DRAS application 34 via the network communications interface device 68. As explained in further detail below, the ADR Client App 100 also determines a control schedule for the devices 44 of the BAS 22 in response to a DR event message. The ADR Client App 100 communicates with the BAS controller program 54 such that the devices 44 of the BAS may be controlled as determined by the ADR Client App 100. A user interface application 160 is also provided in memory 52. As represented by the dotted lines in FIG. 4, the user interface application 160 may be a separately executable program or a program module of the ADR Client App 100 that works in association with the ADR Client App 100 to provide an output or receive an input. In particular, the user interface application 160 utilizes the components of the ADR Client App 100 to generate and display one or more output screens to a human user and receive inputs from the human user via the physical user interface 60 for use by the ADR Client App 100 as further described in detail herein. For clarity in the discussion, the user interface application 160 may also be referenced herein as the "ADR Client user interface 160".

With continued reference to FIG. 4, the BAS 22 includes a number of field panels 42 or like controllers configured to automatically control various devices 44 in the building automation system 22 based on instructions received from the BAS controller 54. The ADR Client App 100 also performs scheduling for various BAS devices 44 based on the data 56 in the memory 52. The data 56 in the memory 52 includes DR event message information received from the DRAS 14 via the network communications interface 68. The data 56 in the memory also includes various set points and control data for the ADR client application 100, which may be pre-installed in memory 56 or provided by the user through the various input devices 62. Additionally, history, logging and licensing data for the ADR application 100 is retained as data within the memory 52. Operation and functionality of the ADR client application 100 is described in further detail below with reference to FIGS. 5-16.

With continued reference to FIG. 4, the ADR client 18 is connected to the building automation system 22 through a BAS communications interface 48. The ADR client 18 is configured to deliver control signals to the building automation system 22 based on various DR event messages received from the DRAS 14. The building automation system 22 includes one or more field panels 42 or other controllers configured to control and/or monitor the operation of various devices 44 or "points" within a facility of the end user 16, such as HVAC systems 44A, lights 44B, chillers 44C, and numerous other devices or systems 44D and 44E. A "point" as referenced herein that is controlled and/or monitored by a field panel 22 may refer to a respective device 44 or a respective input or output of such device 44. An exemplary building automation system for use in association with the ADR client 18 is described in U.S. Pat. No. 7,664,574, which issued Feb. 16, 2010, the contents of which are incorporated herein by reference in their entirety to the extent permitted by law. The ADR client 18 is configured to communicate with the BAS 22 through the BAS communications interface 48 using one of various communication protocols that may be recognized by the BAS controllers 42, such as BACnet or SOAP.

The electrical energy meter 40 may be electrically and/or communicatively connected to the BAS field panel 42 and is used for monitoring energy consumed at the customer site 16 associated with the respective BAS field panel 42. The energy meter 40 is a conventional or "smart" device that may be connected at the point at which electrical power from the grid is supplied to an end user, and also an electrical power line on which supplemental electrical energy is supplied to the end user. The meter 40 includes components for monitoring usage of electrical power from the grid and the supplemental energy source, and transmitting, over a wireless or wired communication network to the BAS 22 (and/or to the ADR client 18), in real time, data representative of the electrical power being consumed from the power grid and the supplemental energy source that supplied supplemental electrical power to the end user 16. In one embodiment, the energy meter 40 may be a sub-meter, smart meter or like meter which provides to the BAS 22 (and/or to the ADR client 18) such electrical power related information as KW demand, KWH usage, voltage phase, amperage phase, power factor, KVAR and harmonics.

ADR Application Architecture

Figure 5:
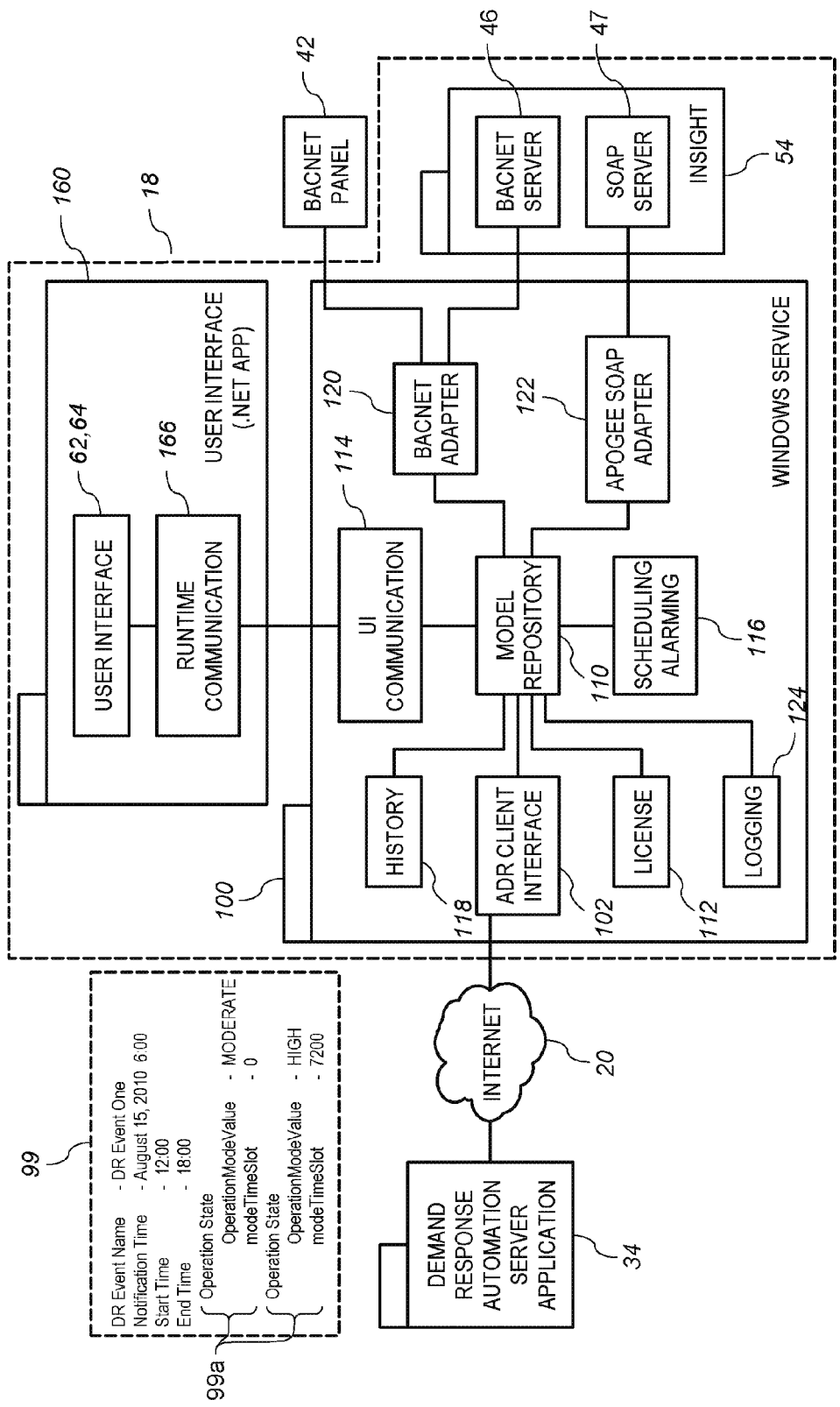
FIG. 5 shows a functional block diagram of the architecture of the ADR client application of FIG. 4 in association with a field panel of a building automation system and the DRAS application.

With reference now to FIG. 5, a high level functional block diagram of the architecture for the ADR application 100 is shown. The ADR application 100 resides within the memory of the computer workstation that provides the ADR client 18 (represented by dotted lines in FIG. 5). As described previously in FIG. 4, the BAS controller 54 may also reside within the memory of the workstation that provides the ADR client 18. This embodiment is represented in FIG. 5 by the BAS controller software 54 being provided within the dotted lines 18 representing the ADR client workstation.

In one embodiment, the ADR application 100 is configured to operate with a Microsoft Windows® operating system (not shown in figures). However, the ADR application 100 may be implemented to operate with other operating systems, such as Linux or Unix, without deviating from the present invention. In the embodiment of FIG. 5, the ADR application 100 includes a plurality of modules including a model repository 110, a licensing module 112, a UI communications module 114, a scheduling module 116, a history module 118, a logging module 124, a BACnet adapter module 120 (or other BAS network protocol adapter module), a Simple Object Access Protocol ("SOAP") adapter module 122 (or other communication protocol for exchanging structured information between Web Services across a network), and an ADR client interface module 102. The model repository 110 manages these modules of the ADR application 100, which may be run in serial or threaded fashion, to perform various processes related to a DR event. For example, as explained in further detail below, the ADR application is configured to prepare a schedule for the BAS devices and output control messages to the BAS controller 54 when a DR event message 99 is received from the DRAS application 34.

The model repository 110 is the central communications and processing component of the ADR application 100. The model repository 110 is configured to receive a DR event message 99 from the DRAS 14 via an ADR client interface 102. The DR event message 99 generally includes a DR event unique identification (e.g., "DR Event One"), a notification time that indicates when the DR message 99 was transmitted by the DRAS 14, a start time and date (e.g., 1:00 pm, Aug. 1, 2011) for the DR event, and end time and date for the DR event (e.g., 6:00 pm, Aug. 11, 2011), and one or more DR commands 99a that indicate operational states or "modes" within the DR event (also referenced herein as "DR modes"). Each mode within the DR event indicates the severity of load reduction required for that period or portion of the DR event (e.g., a "moderate" mode, "high" mode, "special" mode, etc.). Each DR command 99a identifying a mode in a DR event may also have a mode start time and a mode end time. The DR event messages 99 may be pushed to the ADR client interface 102 upon generation of the message by the DRAS application 34. Alternatively, the ADR client interface 102 may periodically poll the DRAS application 34 to determine if a DR event message 99 is available. Following receipt of the DR event message 99, the ADR client application 100 confirms receipt of the message to the DRAS 14 via the ADR client interface 102, and the DR event message 99 is delivered to the model repository 110 for processing.

A history of DR event commands 99a received by the ADR client interface 102 is maintained in the history module 118. The history module 118 keeps track of all DR events that have been received by the system, and is capable of providing the end user with a graph or tabular view of DR events, as described in further detail below with reference to FIG. 14.

With continued reference to FIG. 5, the model repository 110 is in communication with a license module 112. The license module 112 provides data to the model repository 110 concerning the status of a license which grants the end-user the authority to run and use the ADR application 100 on the ADR client computer 18. If an end-user is licensed to use the ADR application 100, the license module 112 provides a confirmation to the model repository, and the model repository proceeds in running the ADR application software 100. If the license module 112 indicates that the end-user is not licensed to run the software, or has yet to agree to the end-user license agreement, the model repository prevents the ADR application 100 from running, and displays an appropriate message via the user interface application 160.

The model repository 110 communicates with the user interface application 160 via the UI communication module 114 which transfers messages to the user interface application 160 and receives messages from the user interface application 160. The user interface application 160 includes a runtime communication module 166 which provides for output from the model repository to the physical user interface 60, including the display 62 and other outputs, and thus provides the operator with access to the information in the model repository 110. The runtime communication module 166 also facilitates input from the operator via the user input devices 64. As explained in further detail below, the inputs received from the end user are used by the model repository 110 to automatically determine what actions should be taken during a DR event.

The model repository 110 is also in communication with a scheduling module 116. As explained in further detail below, the scheduling module 116 determines what actions should occur for an identified point in the BAS 22 before, during and after each DR mode specified in a received DR message 99 for a DR event or in reference to the start or end of the DR event. The scheduling module 116 also resolves conflicts if (i) conflicting control actions are associated with a device or point in the BAS 22 to be controlled in response to a DR mode specified for a DR event, and/or (ii) multiple DR modes specified for a DR event result in conflicting actions with one or more devices or points of the building automation system 22.

The model repository 110 is configured to deliver messages to the field panels or other BAS controllers 42 of the building control system 22 using a BAS communications module 120. As shown in FIG. 5, the BAS communications module 120 may be configured to deliver messages to the field panels 42, or may be configured to deliver messages to the BAS controller software 54, which then passes control messages to the field panels 42 of the BAS 22 using the protocol used in the BAS 22, such as the BACnet communications protocol. Accordingly, in the embodiment of FIG. 5, the BAS communications module 120 is a BACnet adapter, and a BACnet server 46 is provided by the BAS controller software 54. Upon receiving messages from the BAS communications module 120, the BAS field panels 42 process the messages to control the devices of the building automation system 22. The BAS controllers 42 may also return confirmation messages to the model repository 110 to indicate the status of certain devices of the building automation system 22 (e.g., confirmation that the lights have been dimmed).

In addition to communicating directly with the BAS field panels 42 and the BACnet server 46, the model repository 110 may also communicate with a SOAP server 47 via a SOAP communications module 122 using the SOAP protocol. Messages received by the SOAP server 47 may be, for example, informational messages provided to an operator of the building automation system 22 to inform the operator of various operations or situations related to the DR event.

All actions taken by the model repository 110 are stored in a logging module 124 of the ADR application 100. Accordingly, the logging module 124 provides a tool that keeps track of the internal operation of the ADR application 100. In the event of an error in the ADR application, the logging module provides 124 valuable information that may be used to help determine the source of the error in the system.

The ADR client application 100 described herein may be easily retrofit to existing building automation systems. Since the ADR client application 100 may be installed on the same workstation as the BAS controller 54, communications between the ADR client application 100 and BAS controller 54 may be easily implemented within the workstation. The BAS controller 54 prepares commands to control devices of the BAS 22 based on communications with the ADR client application 100.

It should also be recognized that the ADR client application 100 described herein may be configured to interface with any number of different types of automation systems, including factory automation systems, residential home automation systems, and other automation systems. Implementation of the ADR client application 100 with such differing building automation systems may be consistent with the interfaces described herein in order for the building automation system 22 to provide the user with configurable demand response strategies and techniques for responding to DR commands corresponding to a DR event from a DR server 14, including those strategies and techniques described in further detail below.

Demand Response Audit and BAS Points Control Strategy

A licensed user of the ADR Application 100 may be the owner or operator of an industrial, commercial or residential facility that includes a building automation system 22. For example, FIG. 6 shows an exemplary office building 600 with a plurality of floors or other building automation "zones" and a building automation system 622 configured to control a plurality of building control systems 610 and related devices in each zone. The building control devices and systems include building environmental control systems such as HVAC systems 624 and related devices and lighting systems 626 and related devices. The control systems and devices may also include other energy consuming devices that are not related to the environment within the building, such as car charging stations 628, phone and portable device chargers, refrigerators, ovens, televisions, computers, etc. The building automation system 622 may also be configured to control various safety systems, such as fire alarm systems or theft deterrent systems. If the office building includes any industrial capability, the building automation system may be further configured to control the power to various industrial machines used within the building 600. The term "points" may be used to refer to a particular device or system controlled by a building automation system, or to an input or output of such a device or system.

In addition to energy consuming devices, the office building 600 may also include or be associated with various energy producing devices, such as a wind mill 630, solar panels 632, or a generator 634 configured to burn fossil fuel in order to provide power to the building. If excess energy is produced by the energy producing devices, the excess energy is delivered to the electrical power grid 24 (see FIG. 2), and the electric utility compensates the building owner for the excess energy produced.

The building 600 shown in FIG. 6 is equipped with an ADR client computer 18 (not shown in FIG. 6) that receives DR event messages 99 from the DRAS 14 that is remote from the building 600. In order for the owner of the building 600 to use the ADR client application installed on the ADR client computer, and effectively respond to DR events, the building operator must first conduct an audit of the devices within the building 600 and determine which devices will be affected when a DR event occurs. When conducting this audit, the building operator may know that three different types of DR events are possible, such as a moderate DR event, a high DR event, and a special (or extreme) DR event. During the audit process, the building operator reviews the various points within the BAS and decides which points are available for reduced energy consumption depending on the type of DR mode. For example, the building operator may determine during the audit process that the HVAC could allow the temperature on all floors to be increased to differing degrees for different DR modes. As another example, the building operator may determine that the lights on most floors could be dimmed during all DR events, but that the lights on certain floors should never be dimmed (e.g., if manufacturing occurs on certain floors, a threshold lighting level may be required at all times). Thus, during the DR audit, the building operator identifies various BAS points that may be controlled to respond to DR events of various levels. After identifying these BAS points that will be controlled in response to DR events, the building operator must then come up with a strategy for how and when the BAS points will be controlled.

After performing the audit described in the previous paragraph, the building operator then maps a strategy for reducing the building's power consumption to arrive at the desired load reduction for each different type of DR event or for each different DR mode or serial combination of DR modes that may be specified for a DR event. FIG. 7 shows an example of a demand reduction strategy spreadsheet 700 produced by a building operator for configuring the ADR application 100 in accordance with the present invention, where different BAS devices are targeted for reduced power consumption based on different DR events, where different DR modes or serial combinations thereof may be specified for the different DR events. The spreadsheet includes indicating building operating parameters and power consumption based on various DR modes that may be specified as DR commands 99a of a DR event message 99 received by the ADR application 100 from the DRAS server. In particular, the spreadsheet includes (i) a first column 702 indicating "normal" or "default" conditions for points or devices within the BAS 22 when there is no DR event or DR mode (e.g., no target reduction in power consumption), (ii) a second column 704 indicating a "moderate" DR mode for a DR event (e.g., a 200 KW target reduction in power consumption), (iii) a third column 706 indicating a "high" DR mode for a DR event (e.g., a 400 KW target reduction), and (iv) a fourth column 708 indicating a "special" DR mode for a DR event (e.g., a 600 KW target reduction).

In the first column 702 of the spreadsheet 700, it can be seen that the building operator has determined a typical or "normal" set of building operating conditions. In this normal state, the building's cooling plant consumes 42.45% of the total power consumed, the HVAC fans and air handling devices consume 14.15% of the total power consumed, the lighting systems consume 22.26% of the total power consumed, items plugged into various electrical outlets consume 5.56% of the total power consumed, miscellaneous electrical devices and the data center consume 8.9% of the total power consumed, and the car charging stations consume 6.68% of the total power consumed. This total consumption is shown as 1797 KW in the example of FIG. 7.

At the same time power is being consumed, some power is being produced by the building. In particular, the building's wind turbine is running at full capacity and provides 2.78% of the total power needed, and the photovoltaic cells provide 10.01% of the total power needed. As a result, in the normal operating condition, the building only needs to purchase 87.20% of the total energy needed from the electrical utility via the electrical grid. In the example of FIG. 7, this total power purchased for a given instant 1567 KW.

In the second column 704 of the spreadsheet, the building operator has determined in this example, in the event of a "moderate" DR mode or DR event, power consumption can be reduced by well over 200 KW by manipulating certain points in the building automations system. In particular, the building operator has determined that, when a "moderate" DR event or DR mode occurs, the building can reduce power consumption by 325 KW by increasing the temperature in the building by 3 degrees, dimming the lights in the building by 20% and ceasing all car charging. The transition to the increased temperature, dimmed lights, and ceased car charging begins in advance of the DR event start time (or, alternatively, in advance of the DR mode start time) in order to allow the system to gradually reach the new operating state and avoid sudden changes that would be easily recognized by humans. For example, the 3 degree reduction in temperature may begin an hour before the DR event start time and dimming the lights may begin 5-10 minutes before the DR event start time. These actions result in a cooling load reduction greater than 10% and a lighting load of about 20%.

In the third column 706 of the spreadsheet, the building operator has determined that in this example, in the event of a "high" DR event or DR mode, power consumption can be reduced by nearly 500 KW by manipulating certain points in the building automations system. In particular, the building operator has determined that, when a "high" DR event or DR mode occurs, the building can reduce power consumption by 489 KW by increasing the temperature in the building by 6 degrees, dimming the lights in the building by 30% and ceasing all car charging. Again, the transition to the increased temperature, dimmed lights, and ceased car charging begins in advance of the DR event start time (or in advance of the DR mode start time).

In the fourth column 708 of the spreadsheet, the building operator has determined in this example that, in the event of a "special" DR event, power consumption can be reduced by more than 750 KW by manipulating certain points in the building automations system. In particular, the building operator has determined that, when a "special" DR event occurs, the building can reduce power consumption by 759 KW by increasing the temperature in the building by 6 degrees, dimming the lights in the building by 40% and ceasing all car charging. Again, the transition to the increased temperature, dimmed lights, and ceased car charging begins in advance of the DR event start time (or in advance of the DR mode start time).

FIG. 7 shows that the building operator may determine to control various BAS points 44 using the ADR application 100 differently dependent on the mode of the DR event 99 (i.e., "moderate", "high" or "special"). However, it should be recognized that the building operator may also make control of the various BAS points dependent on other factors, such as the time of day of the DR event, the time of year of the DR event, and the length of the DR event. For example, if a DR event occurs in the middle of the day in the summer, the building operator may choose to dim the lights to a greater degree, but keep the temperature in the building closer to a normal temperature. The reason for this is that the building will likely receive significant amounts of ambient light through the windows in the building, so lighting will be less important to the workers in the building at this time than the temperature in the building. Similarly, if the DR event is in the night in the summer, the building operator may choose to keep the lights closer to full intensity, but allow the temperature in the building to increase to a greater degree since the lighting in the building will be most important to workers at this time. Thus, even though the response strategy mapped out in the spreadsheet of FIG. 7 only considers the mode of the DR event for purposes of simplicity in the example, it will be recognized that more complex strategies that consider other DR event factors such as time of day, season, and length of DR event, will typically be mapped out by the building operator.

It will be recognized that FIG. 7 shows a very simple example of a strategy for responding to various modes of a DR event. The more complex the BAS and the number of associated devices, the more complex the DR event strategy will generally be. In any event, when completing a DR event strategy the user will generally, (i) identify various points of the BAS to control in association with different modes of a DR event, (ii) determine any offset time for control of each point before the start of the mode or the DR event, (iii) determine offset time for control of each point following the end of the of the mode or the DR event. Following this, the user may configure the ADR Application 100 to execute the mapped-out DR event strategy.

ADR Application Configuration

After the building operator completes the building audit and maps out a control strategy for various BAS points, the building operator configures the ADR application 100 for an appropriate or strategic response to a DR event, including a pre-DR mode process strategy and a post-DR mode strategy for responding to each anticipated DR command 99a. The ADR application 100 may generally be configured according to one of three options for processing the DR event message 99 received from the DRAS 14. Each of these three options is briefly explained in the following paragraphs.

According to a first option for configuring the ADR application 100, the ADR application 100 generally serves as a pass-through translator component that delivers the DR command 99a (specified in a DR event message 99) to the building automation system 22 according to the communications protocol of the building automation system (e.g., BACnet or other protocol). In particular, the ADR application 100 delivers the DR event information 99 to various field panels 42 of the building automation system 44. In this embodiment, all DR event response strategies and control actions are programmed directly into the field panels 42 in their particular language (e.g., PPCL or other equivalent control programming language). Therefore, under this first option, the ADR application 100 is not used to implement the strategies resulting from the DR audit, and merely serves as a pass-through translator component for the DR commands 99a specified by or associated with the DR event for delivery to the BAS 22 after translating such DR commands 99a into communications protocol of the BAS 22.

According to a second configuration option, the ADR application 100 is used to determine the BAS points 44 that will be controlled and a schedule for associated actions in response to a DR command 99a that may be specified by or associated with the DR event. In this option, the building operator uses the graphical user interface 60 of the ADR client 18 to program the ADR application 100 to respond to various DR commands as determined by the response strategies to the DR audit. Once the response strategies are entered into the ADR client 18 by the operator, the ADR application 100 automatically generates a corresponding response for each DR mode that may be specified by a DR command 99a in a DR event message 99 received from the DR server 14 based on the devices or points 44 and corresponding control actions for the devices or points that have been identified to the ADR application 110 as being associated with the specified DR mode. In addition, the ADR application 100 includes a scheduler component (see reference numeral 116 in FIG. 5) that automatically generates a schedule of the control actions for various BAS points in response to each DR command 99a specified by a respective DR event message 99. Additional details of the operation of the scheduling component 116 will be explained in further detail below. The scheduler component 116 of the ADR application 100 also includes a conflict resolution feature that prevents conflicts in operating the various BAS points 44 based on (i) conflicting control actions in the pre-process strategy for controlling a respective BAS point 44 in response to a respective DR command or DR mode specified in a DR event 99, where the conflicting control actions are associated with overlapping control periods relative to the start time of the DR mode for the DR event and the end time of the DR event; (ii) conflicting control actions in the prost-process strategy for controlling a respective BAS point 44 in response to a respective DR command or DR mode specified in a DR event 99, where the conflicting control actions are associated with overlapping control periods relative to the end time of the DR mode for the DR event and the end time of the DR event; or (iii) the post-process strategy of a response to a first DR command specified in a DR event 99 and a subsequent DR command specified in the same DR event 99, as will also be explained in further detail below. After the scheduler component prepares the schedule of actions to control the BAS points 44, the ADR application 100 implements the schedule by sending control messages to the BAS field panels 42 at the appropriate times to control various BAS points 44. Because the ADR application 100 is capable of communicating with the BAS field panels 42 according to the communications protocol of the building automation system (e.g., BACnet or other protocol), all Demand Response programming may be accomplished at the ADR client, and there is no need to perform additional programming at the BAS field panels 42 (e.g., using PPCL or another control programming language). For example, in an embodiment in which the BAS field panels 42 employ the BACnet communication protocol and the BAS controller 54 has a corresponding BACnet server 46 for controlling the BAS field panels, the ADR application 100 of the ADR client 18 may be configured to provide or "stack" BACnet control commands to the BACnet server 46 of the BAS controller 54 in accordance with the schedule of actions generated by the ADR application 100 for responding to the series of DR commands or DR modes specified by the DR event 99 received by the ADR application 100. Accordingly, the ADR application 100 is useful in retrofitting existing building automation systems with Demand Response capabilities without the need for additional programming of the BAS field panels.

According to a third configuration option, the ADR application 100 is configured to include components of the first configuration option and the second configuration option described above. In addition, additional programming at the BAS field panels may be needed to carry out certain DR control actions. For example, under this third configuration option, the ADR application 100 processes a DR command 99a and generates the appropriate DR response for various BAS points, similar to that described above in reference to FIG. 2. Under the third configuration option, the response strategies entered in the ADR Client act as flags to enable or disable the execution of the control programming blocks that are pre-programmed at the BAS field panel 42. Similar to the second configuration option, the scheduler component 116 automatically generates a schedule of actions for various BAS points in response to each DR event message 99.

Figure 8:
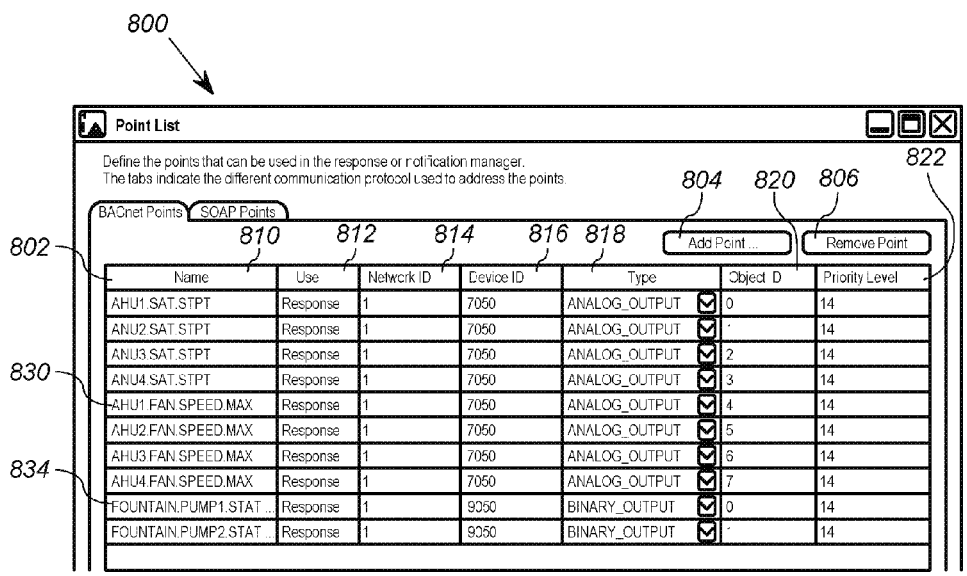
FIG. 8 shows a graphical user interface screen generated by the ADR client application of FIG. 5, where the screen is configured to enable an end user to and identify points of a building automation system to the ADR client application.

When the building operator decides to configure the ADR application 100 under one of the configuration options, the ADR client 18 is provided with or receives various BAS points 44 that will be controlled by the ADR application 100. In order to program the BAS points 44 into the memory of the ADR client 18, the building operator makes use of the ADR Client user interface 160. An exemplary embodiment of a screen generated by the ADR Client user interface 160 that may be used to program BAS points 44 into the ADR client 18 for processing by the ADR application 100 is shown in FIG. 8. The screen 800 is entitled "Point List". This screen includes a table 802 that lists all BAC points stored by or known to the ADR application 100. The ADR Client user interface 160 enables a user to add new points to the table 802 by actuating a button 804 presented on screen 800 and remove points from the table 802 by actuating another button 806 presented on screen 800.

By actuating or clicking on button 804, the user signals to the ADR Client user interface 160 to add a new row to the table 802 so that the user may identify a new BAC point to add to the table 802. In the example screen 800 shown in FIG. 8, the user enters the name of the new BAC point to be controlled by the ADR client 18 in column 810. In one embodiment, the point name is mapped by the ADR Client user interface 160 to the network address of the respective point in the building automation system 22 so that the ADR Client App 100 may send control actions to the corresponding point based on the point name. For example, the ADR Client user interface may employ point name mapping to a network address and device type using an industry standard network mapping protocol such as the BACnet protocol as further explained below. In this embodiment, the name entered in column 810 may be any name chosen by the user, and generally identifies the type of point and a location (or building zone) for the point.

After entering the name of the point, the user identifies to the ADR Client App 100 in column 812 whether the point will be a notification point or a response point. Notification points are generally those points that indicate the status of a DR event. Response points are generally those points that will control the building environment or a building device in response to a DR command.

Continuing with the example shown in FIG. 8, the user identifies to the ADR Client App 100 in column 814 the network of the building automation system where the point resides. Next, in column 816, the user identifies the device ID or network address to the ADR Client App 100. In column 818, the user assigns a value type to the named point. The value type may be selected from a drop down menu associated with column 818. Exemplary value types may be analog values, binary values, or multi-state values. For example, the fan speed setting in row 830 may be an analog value, indicating that it may be any of various numerical values. As another example, the fountain pump in line 834 may be a binary value, indicating that the pump is either on or off.

In the example shown in FIG. 8, an object ID is identified by the user to the ADR Client user interface 160 in column 820. The identified object ID is used by the ADR Client user interface 160 and the ADR Client App 100 to associate the corresponding point in table 802 with a certain type of device. For example, object ID "7" may identify that the point is a fan, while object ID "2" may identify the point as an air handling unit. Finally, the user identifies to the ADR Client user interface 160 a priority level to associate with the corresponding point in column 822. The priority level generally indicates the relative weight that control of this point should be granted by the ADR Client App 100 and the BAS 22 relative to other points 44 in the BAS 22. The ADR Client App 100 may use this priority level data in column 822 when generating a schedule and resolving conflicts, as described in further detail below.

In another embodiment, the point name identified by the user in column 810 of the table 802 matches the network address naming convention of the respective BAS 22 so that the ADR Client user interface 160 and the ADR Client App 100 do not need to map the respective point name to the network address and device type of the respective point in the BAS 22. In this embodiment, the BAS 22 may store a table of point names in the BAS 22 that are controlled and/or monitored and mapped to the physical network location of the points in the BAS 22 to facilitate communication with the respective points. In this embodiment, the user specifies to the ADR Client user interface 160 the point name in column 810, whether the corresponding point is a notification point or a response point (or "Use type") in column 812 and the priority level of the point relative to other points in column 822 so that the ADR Client App 100 may then send control actions to the corresponding point based on at least the point name, use type and corresponding priority level.

The ADR Client user interface 160, further enables a user to delete points that were previously added to the system by actuating button 806 on screen 800. This allows the user to modify the defined building control system within the ADR client 18 both during initial setup and at a later date should the building undergo changes that drop certain points or devices associated with certain points from the building automation system 22.

After the user assigns points to the ADR client 18 using the ADR Client user interface 160 as described, the ADR Client user interface 160 enables the user to specify each point 44 that is to be configured for control actions in response to each DR command or DR mode that may be specified in any DR message 99 for a DR event. As mentioned previously, each DR event includes one or more modes (e.g., "moderate", "high", and "special" modes), and each DR message 99 includes one or more DR commands 99a that are each associated with a respective mode. In order for the ADR client application 100 to properly control points of the BAS during a DR event based on the one or more commands 99a in the corresponding DR event message 99, the user identifies to the ADR client application 100 (via the ADR Client user interface 160) each point 44 of the BAS 22 that will be associated with a DR mode (or corresponding DR command 99a) that is anticipated to be in a DR event message 99 so that the ADR client application 100 is able to identify the points 44 to be controlled and to command the corresponding control actions to the identified points 44 in response to the respective DR mode (or corresponding DR command 99a). For example, for each point 44 that is identified in table 802, the ADR Client user interface 160 enables the user to associate the respective point with a DR mode and identify how and when the point should be controlled (i.e., the control actions for the point) during the associated mode of a DR event (i.e., in response to a DR command 99a). In general, the ADR Client user interface 160 enables a user to configure or specify a control action for an identified point to be performed before, during and/or after a respective DR mode that may be specified by a corresponding DR command 99a in a DR message 99 as processed by the ADR Client App 100 for an upcoming DR event. In addition, the ADR Client user interface 160 enables a user to configure or specify a control action for an identified point for control before or after the specified start or end time of a DR event. In at least one embodiment, the ADR Client user interface 160 is further configured to enable the user to selectively specify control of an identified point by the ADR Client App 100 before or after a DR event relative to start or end time of a respective DR mode specified for the DR event irrespective of whether the DR mode is the first or last mode specified for the DR event. In another embodiment, the ADR Client user interface 160 is further configured to enable the user to selectively specify control of an identified point by the ADR Client App 100 before or after a DR event depending on the first or last mode of the DR event.

Figure 9A:
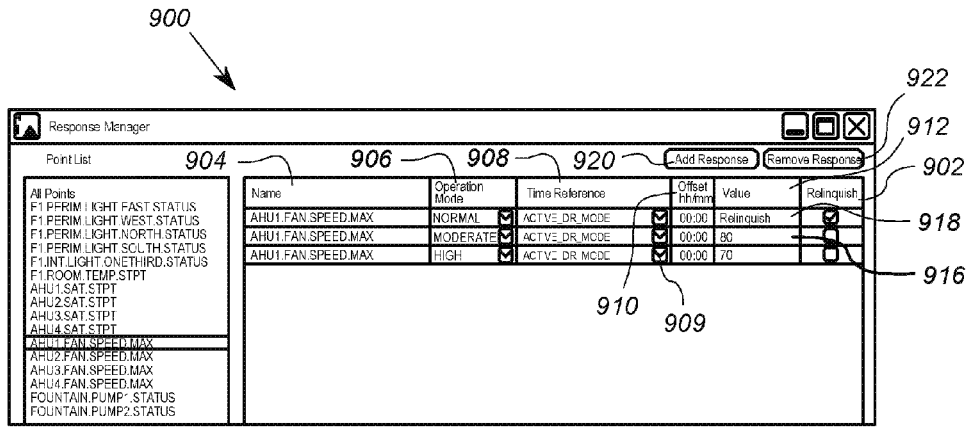
FIG. 9A shows a graphical user interface screen generated by the ADR client application of FIG. 5, where the screen is configured to enable an end-user to configure the points of the building automation system for control during various modes of a DR event.

FIG. 9A shows an exemplary screen 900 generated by the ADR Client user interface 160 to enable the user to configure points for various control actions (which actions may be referred to herein as "point control actions"). In one embodiment, the ADR Client presents a points list 901 in a pane of screen 900, where the points list includes the name or identifier of each point identified by the user to the ADR Client user interface 160 (e.g., each point name identified in table 810). Each point name or identifier in the points list 901 may be selected by the user via any input device 64 (e.g., mouse click or touchscreen input) for configuring or assigning point control actions using the ADR Client user interface 160. In the embodiment shown in FIG. 9A, the user has selected the name or identifier for the "AHU1.FAN.SPEED.MAX" (i.e., air handling unit 1 fan speed) point for configuring or assigning corresponding point control actions. When the user selects the point to be controlled from the points list 901, the ADR Client user interface 160 presents a table 902 on the screen 900 with the name or identifier of the selected point in column 904. The ADR Client user interface 160 then receives from the user a selected DR mode to assign to or associate with the selected point in column 904. In the embodiment of screen 900 shown in FIG. 9A, the ADR Client user interface 160 enables the user to select a DR mode in column 906 from one of a plurality DR modes presented in a drop-down menu to associate with the selected point. The DR event mode may be any of the possible DR event modes, such as "normal", "moderate", "high" or "special". For each point that is selected by the user to be configured, at least one row of the table 902 is configured automatically by the ADR Client user interface 160 to assign or associate the "normal" mode with the respective point. As discussed in further detail below, the ADR application 100 is able to access the table 902 and use the "normal mode" as an index in the table 902 to identify control actions assigned or associated to each identified point in the table 902 for the "normal" mode so that the ADR application 100 may control the respective points after the end of a DR event, when the BCS 22 is returned to normal mode operation.

After the user selects the DR mode in column 906 (which is assigned to and stored in the table 902 in association with the corresponding point name or identifier in column 904 by the ADR Client user interface 160), the ADR Client user interface 160 then receives from the user a selected "time reference" in column 908 to assign to or associate with the selected point in column 904 based on the respective assigned or associated DR mode in column 906. As explained in further detail below, when a DR command 99a is received in a DR event message 99, the ADR Client App 100 associates the DR command 99a with a corresponding DR mode and uses the corresponding DR mode as an index to identify the corresponding points in the table 902 that have been assigned to be controlled based on the user selected time reference 980 for the respective DR mode. In the embodiment shown in FIG. 9A, the ADR Client user interface 160 receives the time reference to associate with a respective point in table 902 via a user "time reference" selection from a drop-down menu 909 provided by the ADR Client in association with column 908. In this embodiment, the drop-down menu 909 may offer five time reference options in which the point will be controlled or scheduled for control by the ADR Client App 100. These five time reference options include (i) when the selected DR mode (from column 906) is active (i.e., ACTIVE_DR_MODE in the drop-down menu 909 of column 908), (ii) before the selected DR mode is active or starts (i.e., START_TIME_DR_MODE in the drop-down menu 909 of column 908), (iii) after the selected DR mode is active or ends (i.e., END_TIME_DR_MODE in the drop-down menu 909 of column 908), (iv) before the start of the DR event relative to the start of the selected DR mode regardless of the order of the DR mode in the DR event (i.e., START_TIME_EVENT in the drop-down menu 909 of column 908), and (v) after the end of the DR event relative to the end of the selected DR mode, regardless of the order of the DR mode in the DR event (i.e., END_TIME_EVENT in the drop-down menu 909 of column 908).

Once a time reference (i.e., a time control period associated with the DR event) is identified in column 908 (and assigned to and stored in the table 902 in association with the corresponding point name or identifier in column 904 by the ADR Client user interface 160 and the identified DR mode in column 906), the ADR Client user interface 160 then receives from the user a selected offset time in column 910 to associate with the respective time reference 908. The offset time 910 indicates the time at which the associated point will be controlled by the ADR Client App 100 based on the identified time reference 908 and a corresponding control action identified in column 912 for the respective DR mode 906 associated with the respective point. Thus, if the identified time reference 908 is before the selected DR mode begins (i.e., START_TIME_ DR_MODE), the offset time 910 indicates a time before the start of the identified DR mode when an associated control action for the point will be initiated by the ADR Client App 100. If the selected time reference 908 is after the selected DR mode ends (i.e., END_TIME_DR_MODE), the offset time indicates a time following the end of the identified DR mode when an associated control action for the point will be initiated by the ADR Client App 100. Similarly, if the selected time reference 908 is before the DR event begins (i.e., START_TIME_EVENT), the offset time 910 indicates a time before the start of the DR event when an associated control action for the point will be initiated by the ADR Client App 100. Also, if the selected time reference 908 is after the DR event ends (i.e., END_TIME_EVENT), the offset time indicates a time following the end of the identified DR event when an associated control action for the point will be initiated by the ADR Client App 100. Although no offset times are shown for the points identified in column 904 in FIG. 9A, FIGS. 9B-9C discussed in further detail below, show exemplary offset times 910 that may be entered by the user using the ADR Client user interface 160 to configure a point control action at a particular time either before or after a DR mode.

To facilitate understanding of the time references and offset times in columns 908 and 910, reference is made to the example DR event of FIG. 11A. This exemplary DR event 1110 (consistent with DR event message 99) includes two or more DR commands each having an associated active period 1130 and 1140. As described in the previous paragraph, an event may be associated with a number of different periods. These periods may include a pre-active event period 1120 (i.e., a time period immediately before the DR event begins), an active event period 1130 that includes one or more DR modes (i.e., the actual time period for the DR event with one or more active modes occurring during the DR event, such as modes 1130 and 1140), and a post-active event period 1150 (i.e., a time period immediately after the DR event ends). In addition, each DR mode of the DR event may also include a pre-mode period (e.g., period 1121 which may be the same or different than pre-active period 1120) and a post-mode period (e.g., period 1132 or period 1151, which may be the same or different than the post-active event period 1150). The BAS points 44 may be controlled by the ADR Client App 100 to take different control actions during different periods and different modes within a DR event 1110. Thus, a point may be controlled in one manner during a pre-event period 1120 associated with one DR mode regardless of whether that DR mode is the first DR mode specified for the DR event, in another manner during a pre-mode period 1121 of the one DR mode for the DR event, in yet another manner during an active period of the one mode 1130 for the DR event, in yet another manner during a post-mode period 1132 of the one mode 1130 for the DR event, in still another manner during an active period for another mode 1140 of the DR event, and in still another manner during a post-event period 1150 associated with the other DR mode regardless of whether that DR mode is the last DR mode specified for the DR event. Accordingly, as described above with reference to FIG. 9A, the user may choose a time period to associate with the point control action in column 912. These various options are represented in FIG. 11A as follows: (i) controlling the point at a start of a DR mode (e.g., pre-"high" DR mode period 1121 in FIG. 11A); (ii) controlling the point when the DR mode is active (e.g., "high" DR mode period 1130 or "moderate" DR mode period 1140 of FIG. 11A); (iii) controlling the point following the end of a DR mode (e.g., post-"high" mode period 1132 or post-"moderate" mode period 1151 in FIG. 11); (iv) controlling the point at the start of a DR event (e.g., pre-DR event period 1120 in FIG. 11A, which is shown in FIG. 11A as associated with the "high" DR mode 1130, but a pre-DR event period could also be associated with the "moderate" DR mode 1140 for the same point); and (v) controlling the point at an end of the DR event (e.g., post-DR event period 1150 in FIG. 11A, which is shown in FIG. 11A as being associated with the "moderate" DR mode, but a post-DR event period could also be associated with the "high" DR mode for the same point).

Figure 9B:
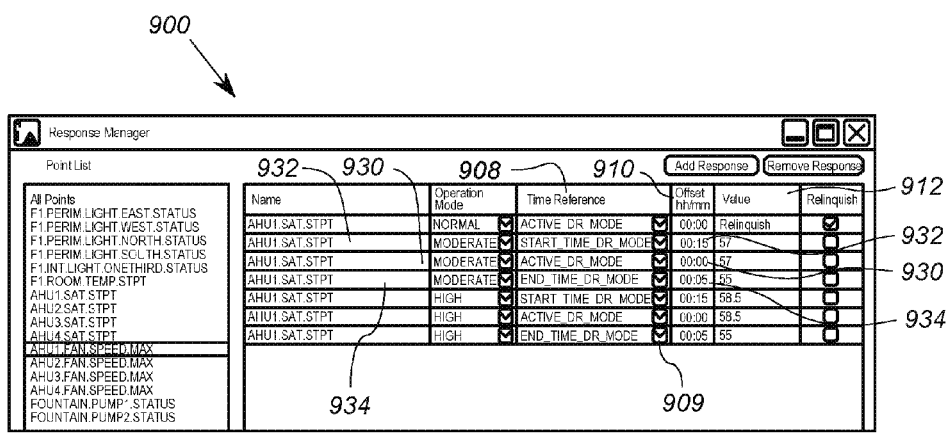
FIG. 9B shows another graphical user interface screen generated by the ADR client application similar to that of FIG. 9A and configured by the ADR client application to enable an end-user to configure the points of the building automation system for control during various periods of a DR event, including periods before and after a mode of a DR event.

With reference now to FIG. 9B, another exemplary points configuration screen 900 generated by the ADR Client user interface 160 is shown that includes offset times in column 910. In the example of FIG. 9B, using the ADR Client user interface 160, the selected point (i.e., "AHU1.SAT.STPT") has been configured for control with offset times at both the start and end of two DR modes so that the ADR Client App 100 schedules the respective pre-mode control action and respective post-mode control action for the selected point. To set up a control action under this scenario, the user specifies (and the ADR Client user interface 160 receives and stores in table 902 as data 56 in memory 52) three control actions for the selected point (i.e., "AHU1.SAT.STPT") for each DR mode (i.e., three control actions for each DR mode the point will be controlled under). The first control action is shown in row 930 and includes an identification of the control point (i.e., "AHU1.SAT.STPT"), the DR operation mode (i.e., "moderate"), the time reference (i.e., "ACTIVE_DR_MODE"), an offset time of zero, and the value that the control point must be commanded to (see column 912). Thus, in row 930, the identified point has been configured for control during a period when the "moderate" mode is active (i.e., the period for the moderate mode defined by the DR command 99a, which also referenced generally as a "DF control period"). The second control action is shown in row 932 and includes an identification of the control point (i.e., "AHU1.SAT.STPT"), the DR operation mode (again, "moderate"), the time reference (i.e., "START_TIME_DR_MODE"), an offset time value to execute the control action before the start of the "moderate" DR mode, and the value that the control point must be commanded to. Thus, in row 932, the identified point has been configured for control during a period that begins fifteen minutes before the start of a "moderate" mode and ends when the "moderate" mode is active. This pre-mode period is also referenced generally as a "DF control period". The third control action is shown in row 934 and includes an identification of the control point (i.e., "AHU1.SAT.STPT"), the DR operation mode (again, "moderate"), the time reference (i.e., "END_TIME_DR_MODE"), an offset time value to execute the control action after the end of the DR mode, and the value that the control point must be commanded to. Thus, in row 934, the identified point has been configured for control during a period that starts at the end of the active period "moderate" mode and ends five minutes following the end of the active period for the "moderate" mode. This post-mode period is also referenced generally as a "DF control period". In addition to configuring this control point for the "moderate" mode, FIG. 9B also shows a similar configuration for the "high" mode with various point control actions set up for DF control periods before, during and after the active "high" mode.

Figure 9C:
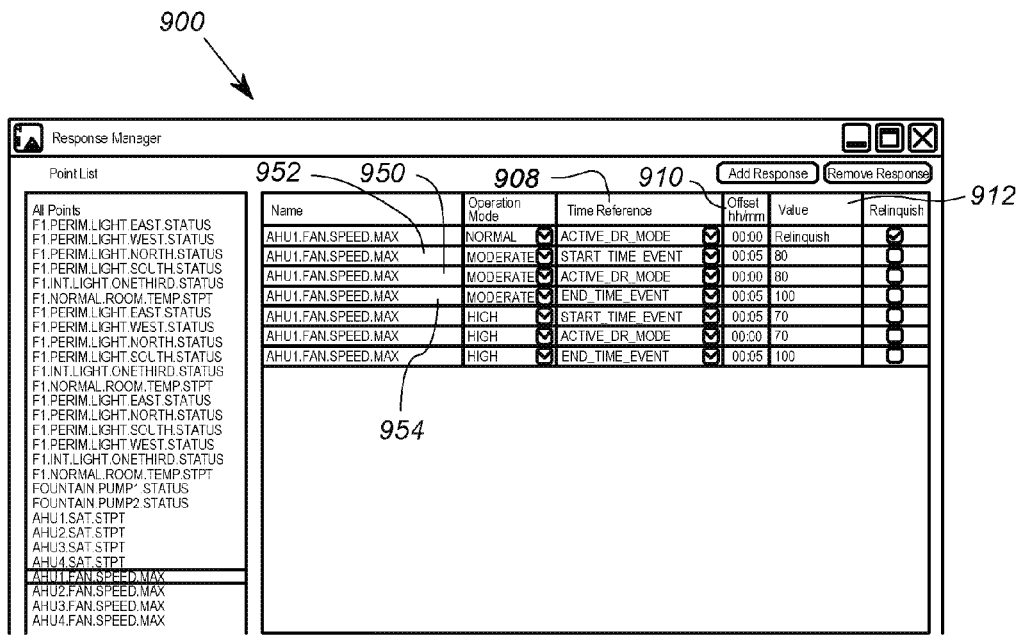
FIG. 9C shows yet another graphical user interface screen generated by the ADR client application similar to that of FIG. 9A and configured by the ADR client application to enable an end-user to configure the points of the building automation system for control during various periods of a DR event, including periods before and after a DR event.

With reference now to FIG. 9C, yet another exemplary points configuration screen 900 generated by the ADR Client user interface 160 is shown that includes offset times in column 910. In the example of FIG. 9C, the selected point (i.e., "AHU1.FAN.SPEED.MAX") has been configured using the ADR Client user interface 160 for control with offset times at both the start and end of two DR modes that either begin or end a DR event. To set up a control action under this scenario, the user specifies (and the ADR Client user interface 160 receives and stores in table 902 as data 56 in memory 52) three control actions for the selected point (i.e., "AHU1.FAN.SPEED.MAX") for each DR mode. The first control action is shown in row 950 and includes an identification of the control point (i.e., "AHU1.FAN.SPEED.MAX"), the DR operation mode (i.e., "moderate"), the time reference (i.e., "ACTIVE_DR_MODE"), an offset time of zero, and the value that the control point must be commanded to (see column 912). Thus, in row 950, the identified point has been configured for control during a period when the "moderate" mode is active (i.e., the period for the moderate mode defined by the DR command 99a, which also referenced generally as a "DF control period"). The second control action is shown in row 952 and includes an identification of the control point (again, "AHU1.FAN.SPEED.MAX"), the DR operation mode (again, "moderate"), the time reference (i.e., "START_TIME_EVENT"), an offset time value to execute the control action before the time reference which in this instance is before the start time of the DR event 99 in which the "moderate" DR mode is specified, and the value that the control point is to be commanded. Thus, in row 952, the identified point has been configured for control during a period that begins five minutes before the start of any DR event in which a DR "moderate" mode or command 99a is specified in a DR event message 99 received by the ADR Client App 100, and ends when the respective DR "moderate" mode begins. This pre-event period is also referenced generally as a "DF control period." In at least one embodiment, this defined DF control period before the start of a DR event occurs regardless of the order of the DR mode (e.g., the "moderate" mode may be the second of two DR modes specified in a received DR event message 99a) within the DR event. The third control action is shown in row 954 and includes an identification of the control point (i.e., "AHU1.FAN.SPEED.MAX"), the DR operation mode (again, "moderate"), the time reference (i.e., "END_TIME_EVENT"), an offset time value to execute the control action after the time reference which in this instance is after the start time of the DR event 99 in which the DR "moderate" mode is specified, and the value that the control point is to be commanded. Thus, in row 954, the identified point has been configured for control during a period that starts five minutes after the end of any DR event in which a DR "moderate" mode or command 99a is specified in a DR event message 99 received by the ADR Client App 100, and this control period ends when a next control action is commanded by the ADR Client App 100 in accordance with the next DR mode. The next DR mode may be a DR "normal" mode (such as DR "normal" mode" 1160 in FIG.

11A) if no other DR modes are specified for the DR event in the respective DR event message 99. This post-event period is also referenced generally as a "DF control period." Similar to row 952, the control period defined in row 954 may occur regardless of the order of the "moderate" mode in the DR event. In the event a user wishes to achieve different degrees of demand reduction for different DR operation modes (i.e., "moderate", "high" or "special"), the user may use the ADR Client user interface 160 to associate the respective point with different modes and configure different control point actions for each mode. Thus, a user may wish to configure a point to be controlled by the ADR Client App 100 before or after a DR event with a plurality of different modes. For example, in FIG. 9C, using the ADR Client user interface 160, the user has configured the "AHU1.FAN.SPEED.MAX" point in association with the "moderate" mode in rows 950, 952 and 954, but has also configured the same point in association with the "high" mode in the rows following row 954.

With reference again to FIG. 9A, the user also enters a value to associate with the point control action in column 912. The ADR application 100 uses this value to provide control signals to the BAS field panels 42 such that the identified point is controlled at the value (i.e., a point control action). As an example, the value "80" in row 916 indicates that the fan speed should be set to 80% of maximum during the active time period of a "moderate" mode. Similarly, the "relinquish" value in row 918 indicates that the fan speed should return to a normal operational state following completion of a DR event.

After entering the above information for a BAS point 44 to be controlled during a DR event, the ADR Client user interface 160 enables the user to add additional point control actions for the same BAS point or additional points using the "Add Row" button 920 presented on the screen 900. Additional control actions for the same BAS point may be desired if the point will be controlled differently in different modes during a DR event, before the start of a DR event, or after a DR event. Additionally, if the user wishes to remove certain point control actions previously entered, the user may select the "Delete Row" button 922 presented on the screen 900 by the ADR Client user interface 160. Accordingly, the point control actions for DR events may be modified by the user over time via the ADR Client user interface 160.

Figure 10:
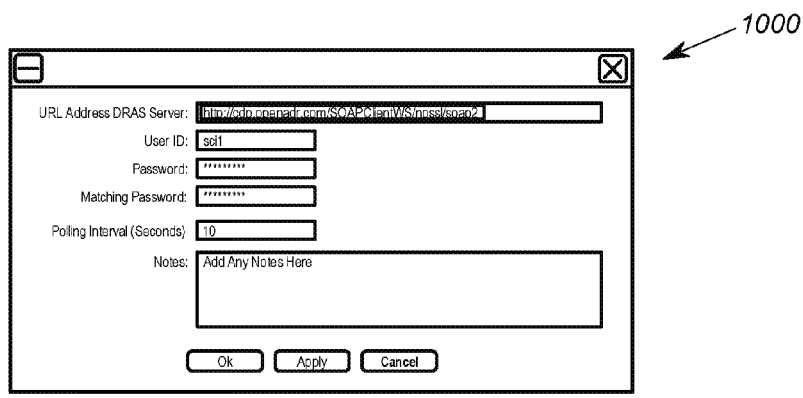
FIG. 10 shows a graphical user interface screen generated by the ADR client application of FIG. 5, where the screen is configured to enable an end-user to enter data to enable the ADR client application to establish communications with the DRAS of the utility.

With reference now to FIG. 10, an additional setup feature for the ADR client 18 is to establish a communications link with the DRAS 14. In one embodiment, the ADR Client user interface 160 generates and displays an ADR Communications Settings screen 1000 to enable the user to establish the communications link between the respective ADR client 18 and the DRAS 14. The ADR Communications Screen 1000 enables the user to input a URL address for the DRAS 14, and a polling interval for contacting the server. The user also inserts a username and a password so that the ADR Client user interface 160 may use a user profile authentication technique to confirm that the user is authorized to make modifications to the communications link between the ADR client 18 and the DRAS 14.

Scheduling for Demand Response Events

With reference now to FIG. 11A, an exemplary DR event 1110 as processed by the ADR Application 100 in accordance with a received DR event message 99 is shown in graphical form with time along the x-axis and event mode along the y-axis. The ADR client application is able to recognize that the DR event 1110 begins at time 8:00 and ends at time 9:00 as specified in the DR event message 99.

In this example, the ADR client application recognizes that the DR event 1110 is associated with a number of different periods, including two active modes corresponding to two DR commands 99a specified in the DR event message 99. In the example shown in FIG. 11A, one active mode of the DR event 1110 is a "high" DR mode 1130 that is active from 8:00 to 8:30. The "high" DR mode 1130 is immediately followed by a "moderate" DR mode 1140 that is active from 8:30 to 9:00, when the DR event 1110 ends. The DR event message 99 from the DRAS 14 provides information on the modes for the DR event as DR commands 99a (see FIG. 5) to the ADR client 18.

In addition to the DR event information provided by the DR event message 99, a pre-DR event period 1120 and a post-DR event period 1150 may also be determined by the ADR client 18 via the ADR Client App 100, based on the offset times 910 described previously with reference to FIGS. 9A-9C. As shown in FIG. 11A, upon determining that a first DR command 99a in the DR message 99 currently being processed corresponds to a "high" DR mode, the ADR Client App 100 identifies the points 904 in table 902 that are associated with a "high" DR mode in column 906 and discovers that at least one point has a time reference 908 defining a pre-DR event start period 1120 (e.g., "START_TIME_EVENT" associated with "HIGH" DR mode for "AHU1.FAN.SPEED.MAX" in FIG. 9C). In the example shown in FIG. 11A, the ADR Client App 100 recognizes from the table 902 that this pre-DR event start period 1120 associated with the "high" DR mode for controlling the respective point begins ten minutes prior to the DR event. Similarly, the ADR Client App 100 is able to recognize that the same point has a time reference 908 defining a pre-DR mode period associated with the "high" DR mode 906 in table 902. In the example depicted in FIG. 11A, this pre-DR "high" mode period 1121 is graphically reflected as being the same time period as the pre-DR event period 1120. However, the same point may have a pre-DR event start period 1120 that starts before but still overlaps with the associated pre-DR mode period 1121. In this instance, the ADR Client App 100 recognizes that there may be conflicting control actions 912 specified in the table 902 for the same point 904 and resolves the conflicting control actions 912 using a priority conflict resolution method described in further detail below in reference to FIG. 12.

In a similar manner, upon processing each DR command 99a in the current DR event message 99 to identify each DR mode specified for the DR event, the ADR Client App 100 uses the identified DR mode to identify the points in Table 902 that require a control action 912 to be taken during a pre-DR event period, a pre-DR mode period, an active DR mode period, a post-DR mode period, and/or a post-DR event period defined in reference to a respective time reference 908. Continuing with the example shown in FIG. 11A, the ADR Client App 100 is able to determine that at least one point in table 902 associated with each "moderate" DR mode specifies a post-DR event end period 1150 for the point that has a zero offset ends ten minutes after the DR event. The pre-DR event start period 1120 is also a pre-high mode period, since the DR event 1100 begins in high mode at 8:00. Similarly, the post-DR event end period 1150 is also a post-moderate mode period, since the DR event 1110 ends in moderate mode at 9:00. Additionally, because the "high" mode 1130 is immediately followed by the "moderate" mode 1140, a post-"high" mode period 1132 overlaps with the active period of the "moderate" mode 1140. Also, before and after the DR event 1110, the system is in a "normal" mode 1160, as indicated by the normal mode bars from 7:40 to 8:00 and from 9:00 to 9:20 in FIG. 11. This "normal" mode is not a DR command 99a as part of a DR event message 99, but is simply the default or normal operating mode of the system when a DR event is not occurring.

As mentioned previously, point control actions may be scheduled before during or after a particular active mode. In FIG. 11, it can be seen that the post-"high" mode period 1132 overlaps with the active period of the "moderate" mode 1140, and therefore some scheduling conflicts may exist between actions defined by the user within a post-"high" mode period 1132 and a "moderate" mode 1140. Accordingly, in order to avoid conflicts, the ADR client 18 assigns a priority to each point control action based on the time period in which the action is scheduled to occur for the respective event.

FIG. 11B provides another graph representing the same DR event as FIG. 11A, but in FIG. 11B the DR event is shown as a step function 1170 reflecting the resolution by the ADR client application in accordance with the present invention of the conflicting control actions. The step function 1170 moves from a "normal" mode (i.e., no DR event) to a "high" mode at 8:00, from the "high" mode to the "moderate" mode at 8:30, and returns to the "normal" mode at 9:00. Reference numeral 1180 indicates that the actual DR event occurs from 8:00 to 9:00. As shown by step function 1170, two different DR modes occur during this DR event (i.e., a high mode followed by a "moderate" mode. Reference numeral 1182 shows the ten minute period before the start of the DR event. This ten minute period 1182 is both a "high mode start" period (i.e., a pre-high mode period) and an "event start" period (i.e., a pre-event period). Reference numeral 1184 shows a "moderate mode start" period (i.e., a pre-moderate mode period). Reference numeral 1186 shows a "high mode end" period (i.e., a post-high DR mode period). Reference numeral 1188 shows a "moderate mode end" period (i.e., a post-moderate DR mode period) and also an "event end" period. It will be recognized that the length of the DR event in FIGS. 11A and 11B and the associated active mode times, pre-times, and post-times, are merely illustrative, and these times may changes as determined by the DR event (i.e., the actual DR event data from the DR server), and as determined by the individual conducting the DR audit (i.e., the individual who determines the necessary length of time for pre-event activities, pre-mode activities, post-mode activities, and post-event activities).

While the times for the actual DR event in FIGS. 11A and 11B are received from the DRAS server 14, it will be appreciated that the ADR client 18 plans for point control actions related to the DR event at times other than the actual DR event. In particular, the ADR client 18 plans for BAS point control before the DR event (i.e., period 1182), during the DR event (i.e., period 1180), and after the DR event (i.e., period 1188). Any one of such periods when a point control action related to a DR event occurs may be referred to herein as a "DR event control period" or a "DR control period" (i.e., a "demand response control period"), regardless of whether it is a period before the actual DR event, during the DR event (including before, during or after each DR mode or command 99a specified in a DR message 99 for the DR event), or after the DR event. By pre-processing control of various BAS points 44 before the actual start of the DR event, the ADR client 18 avoids offset times that would otherwise be required if the systems attempted to accomplish every event at the exact moment the DR event started. This also allows the BAS to gradually transition into the DR event and/or respective DR modes specified for the DR event such that humans in the building are less inclined to notice that the DR event started (e.g., by gradually dimming lights 10 minutes before the DR event, humans are less likely to notice a significant change in the lighting). Additionally, the post-processing control of BAS points after the end of the DR event allows the control of the BAS points to be staggered, allowing the system to be eased back to the normal mode with appropriate offset times as determined by the building operator.

The above description of FIGS. 11A and 11B suggests that overlapping DR control periods are possible for certain DR events. For example, reference numeral 1186 in FIG. 11B identifies a post "high" DR mode that is a DR control period that occurs simultaneously with a "moderate mode active" DR control period. It is possible during this time that the ADR application 100 may be configured to control the same BAS point in a different manner. For example, in the DR control period corresponding to the post "high" DR mode", the ADR application 100 may be configured to gradually return the lights to 100% from a 70% state. At the same time, in the "moderate mode active" DR control period, the ADR application 100 may be configured to hold the lights at 80% brightness. As another example, the ADR application 100 may be configured to drive the thermostat in a given building zone to 75 degrees in a first DR control period and to 72 degrees in a second DR control period that occurs simultaneously with the first DR control period. Thus, it will be recognized that a conflict resolution process is desirable in order to avoid conflicts caused by the ADR application 100 when determining control operations for certain DR events and/or overlapping DR control periods corresponding to different DR modes.

FIG. 12 illustrates one method implemented by the ADR Application 100 for attempting to resolve conflicts for the control of various BAS points when responding to a DR event. In particular, FIG. 12 shows a table listing various DR modes 1210 and time references 1220. The combination of a DR mode 1210 and a time reference 1220 that is indicative of a DR control period (as illustrated in FIGS. 11A and 11B) associated with the respective DR mode 1210. The table of FIG. 12 also lists an execution order priority 1230 for each possible type of DR control period (i.e., for each possible operation mode 1210 and time reference 1220 combination). In this embodiment, the ADR Application 100 is configured to recognize or determine that higher numbers in the execution order column 1230 of FIG. 12 indicate a higher priority if a point control action from one DR control period is in conflict with a point control action from another DR control period. For example, if a point control action directs a thermostat in "moderate" mode DR control period to go to 75 degrees, but in a post-"high" mode DR control period the thermostat is directed to go to 73 degrees, the ADR Application 100 is configured to use the priority chart of FIG. 12 to assign priority to the action during the moderate mode DR control period of driving the thermostat to 75 degrees, since the "moderate/mode active" combination is assigned a higher priority than the "high/mode end" combination (i.e., 60 is higher than 45, as noted in the table of FIG. 12). This priority chart in FIG. 12 is employed by ADR Application 100 to schedule activities in accordance with the scheduling flowcharts or processes of FIGS. 13A-13D. Of course, in alternative embodiment, without deviating from the scope of the present invention, the ADA application 100 may be configured to recognize that a lower number in the execution order column 1230 indicates a higher priority over a higher number in the execution order column 1230.

Figure 13A:
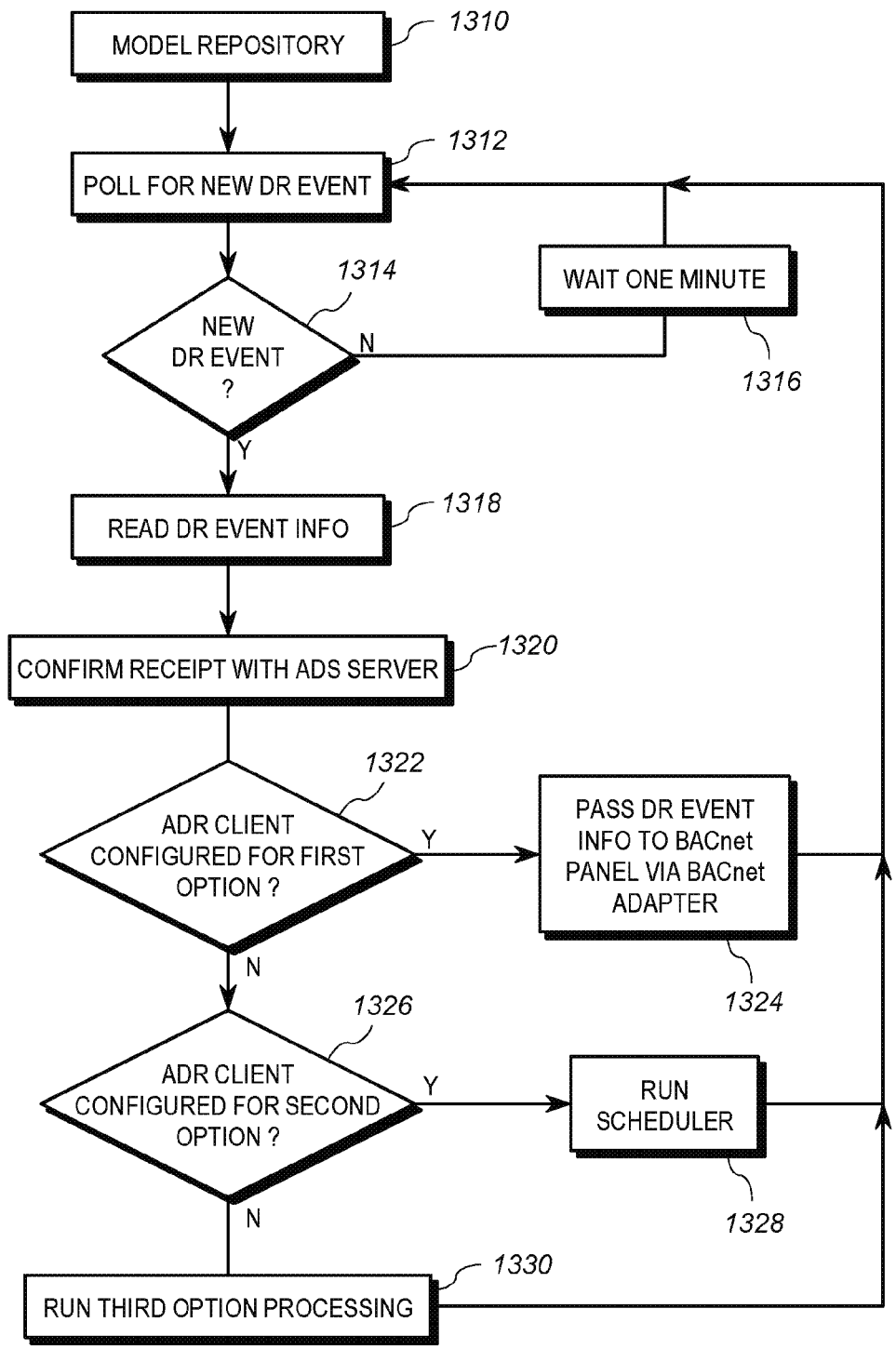
FIGS. 13A-13D shows flowcharts for various processes executed by the ADR client application of FIG. 5, including a scheduling routing in FIGS. 13B and 13C and a schedule conflict resolution screen in FIG. 13D.
Figure 13B:
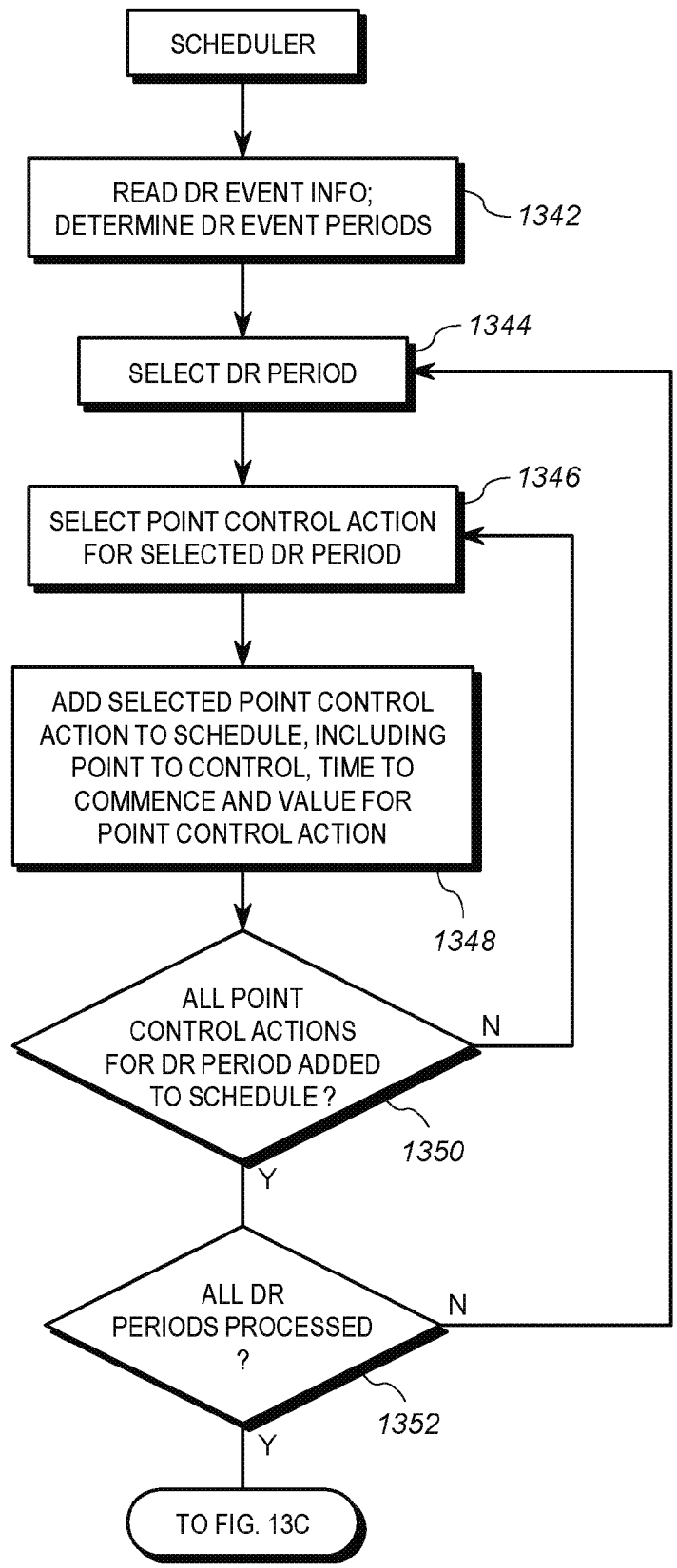
Figure 13C:
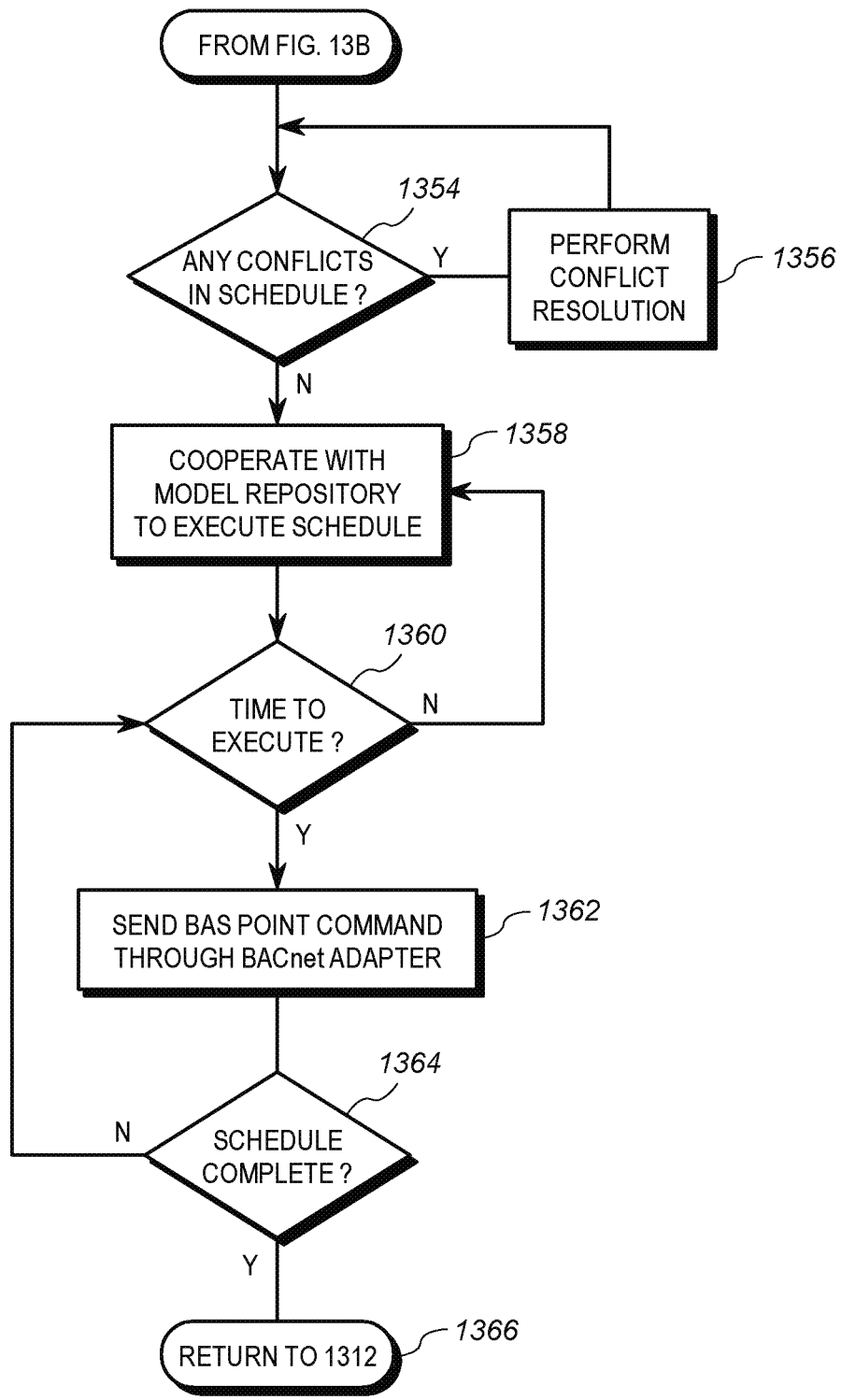
Figure 13D:
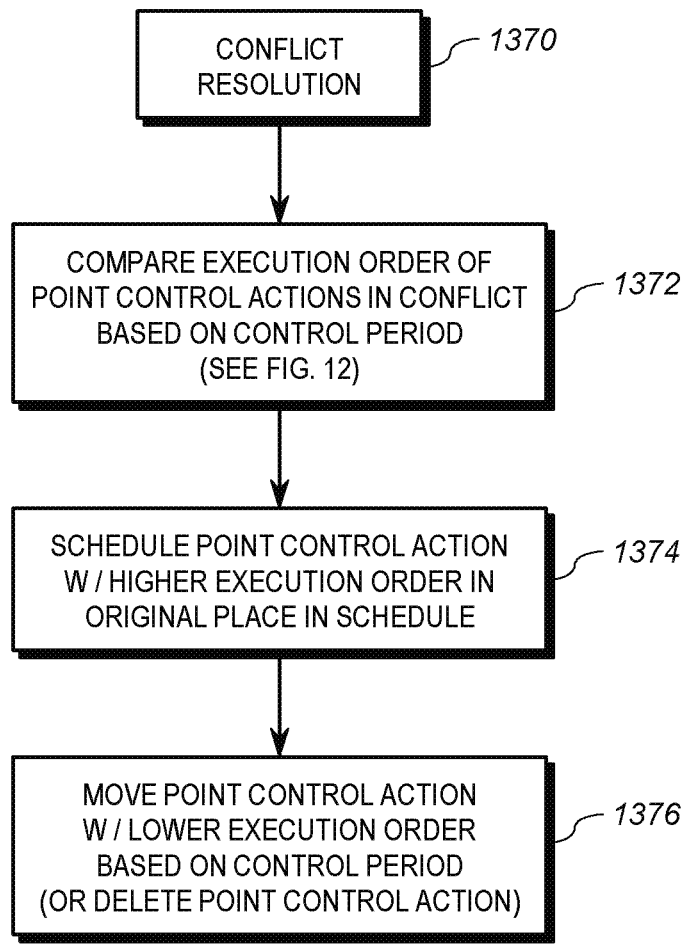

FIGS. 13A-13D shows flowcharts for various processes executed by the ADR client application of FIG. 5, including a scheduling routing in FIGS. 13B and 13C and a schedule conflict resolution screen in FIG. 13D With reference now to FIGS. 13A-13D, flowcharts are provided reflecting processes executed by the ADR Application 100 to schedule BAS point control actions for a DR event. With reference to FIG. 13A, logic 1310 of the model repository of the ADR Application 100 begins with polling the DRAS 14 for a new DR event (step 1312). In step 1314, the ADR Application 100 determines whether a new DR event message 99 is available from the DRAS 14. If no new information is available, the ADR Application 100 of the ADR client 18 waits 1 minute (step 1316) before polling the DRAS 14 again, as noted in step 1312. However, it is determined in step 1314 that information on a new DR event is available, the ADR Application 100 then receives and reads or parses the new DR event message 99 (step 1318). The ADR Application 100 next causes the ADR client 18 to confirm receipt of the new DR event message with the DRAS 14 in step 1320.

As explained previously under the heading "ADR Application Setup", the model repository of the ADR Application 100 may be configured for operating under one of three different optional configurations. In step 1322, the model repository of the ADR Application 100 determines if the ADR application 100 has been configured to operate under the first option. If so, the model repository 110 passes the received DR event message on to the BAS field panels 42 at the start of the DR event via the BACnet adapter 120 without further processing or after translation of the DR message 99 to the appropriate communication protocol, such as BACnet protocol. If not configured to operate under the first option, the model repository of the ADR Application 100 determines in step 1326 if the ADR application 100 has been configured to operate under the second option. If the ADR application 100 has not been configured for operation under the second option, the model repository of the ADR application 100 recognizes that it is configured for operation under the third option, and processing of the DR event under the third option by the ADR application 100 occurs in step 1330. However, if the model repository 110 of the ADR application 100 determines in step 1326 that the ADR client 18 is indeed configured for operation under the second option, the ADR Application 100 activates or executes the scheduler 116 in step 1328 before continuing processing at step 1312.

A flowchart showing general operation of the scheduler 116 of the ADR Application 100 is shown in FIG. 13B. Initially, in step 1342, the scheduler 116 reads the DR event info of the received DR message 99 and determines the DR control periods where point control actions related to the DR event should occur. Next, in step 1344, the scheduler selects one of the DR control periods, and then selects a point control action for the selected DR control period. As explained previously with reference to FIGS. 7 and 9, the ADR Application 100 enables a user or building operator to predefine these point control actions via the ADR Client user interface 160 of the ADR client 18. After selecting one of the point control actions for a particular DR control period, the scheduler next adds the selected point control action to a schedule for the particular DR event. The schedule includes a sequential list of all points that will be controlled for the DR event (e.g., a thermostat to be controlled), a time to commence control of the point or change control of the point (e.g., control of the thermostat will begin at 8:00 pm), a value for the point control action (e.g., a new temperature for a thermostat), a command priority to command the point, and a time to relinquish control of the point (e.g., control of the thermostat will end at 8:30 pm). Next in step 1350, the scheduler 116 of the ADR Application 100 determines if all point control actions for the DR control period have been added to the schedule. If all point control actions have not been added, the scheduler 116 returns to step 1346 and selects another point control action for the selected DR control period. If all point control actions have been selected, the scheduler 116 continues processing at step 1352 and determines if all DR control periods have been processed for the DR event. If all DR control periods have not been processed, the scheduler returns to step 1344 and selects the next DR control period for which point control events will be scheduled. If all DR control periods have been processed, all point control actions for the DR event have been added to the schedule, and the scheduler 116 continues processing at step 1354 shown in FIG. 13C.

As shown in FIG. 13C, the scheduler 116 of the ADR Application 100 next determines whether there are any conflicts in the schedule (step 1354). In one embodiment, the scheduler 116 accomplishes step 1354 by determining whether two point control actions relate to a single point (i.e., point name or identifier in column 904 of table 902) and have overlapping point control periods (i.e., the period between the commence time and end time for one point control action overlaps with the period between the commence time and end time for another point control action for the same point, which the scheduler 116 is able to derive from the DR modes 906, associated time references 908 and corresponding time offsets 910 for the respective point 904 identified in table 902). If there are conflicts to resolve in the schedule, the scheduler then performs a conflict resolution process (step 1356), as described in further detail below with reference to FIG. 13D.

With continued reference to FIG. 13C, once all of the conflicts in the schedule are resolved, the scheduler 116 of the ADR Application 100 cooperates with the model repository 110 of the ADR Application 100 to execute the schedule (step 1358). In particular, the model repository 110 monitors the schedule and a clock (which may be a counter program synchronized with the clock device (not shown in figures) for the processor 50 of the ADR Client 18) to determine if it is time to execute a point control action from the schedule (step 1360). When the time arrives to execute a point control action from the schedule, the model repository 110 continues processing at step 1362 and sends a command to a BAS field panel 42 to control a particular BAS point 44 as noted in the schedule. This command is sent through the BACnet adapter 120 which allows the ADR client 18 to communicate with the BAS 22. Next, in step 1362, the model repository 110 of the ADR Application 100 determines whether the schedule for the DR event is complete. If the schedule is not complete, the model repository returns to step 1360 and waits for the next time when a point control action from the schedule should be executed. Once the schedule is complete, the model repository 110 returns to step 1312 (in FIG. 13A) and the ADR Application 100 then continues to poll the DRAS 14 for new DR event message.

FIG. 13D shows a flowchart for an exemplary conflict resolution process or subroutine that may be performed by the scheduler 116 of the ADR Application 100 at step 1356 of FIG. 13C. When a determination is made that the schedule includes a conflict, the scheduler 116 determines that one of the point control actions in conflict has a higher priority than the conflicting point control action (step 1372). As described previously with respect to FIG. 12, priority for execution of one point control action over another may be based on the DR control modes and DR control periods for the two point control actions. For example, with reference to FIG. 12, a first point control action in a "high mode active" DR control period will have a higher priority than a second point control action in a "moderate mode start" DR control period (i.e., execution order "70" is greater than execution order "55" in the table of FIG. 12). After the scheduler 116 determines the higher priority point control action, the scheduler 116 keeps this higher priority point control action in its original position in the schedule (step 1374). The scheduler 116 then moves the lower priority point control action to a lower execution order in the schedule or, alternatively, removes the lower priority point control action from the schedule (step 1376). For example, the lower priority point control action may be moved to a position in the schedule that immediately follows the time when the high priority point control action has relinquished control of the point. Alternatively, in some situations or embodiments, the lower priority point control action may be completely deleted from the schedule. Upon completion of step 1376, the scheduler 116 continues processing at step 1354 in FIG. 13C.

Demand Response Event History

Figure 14:
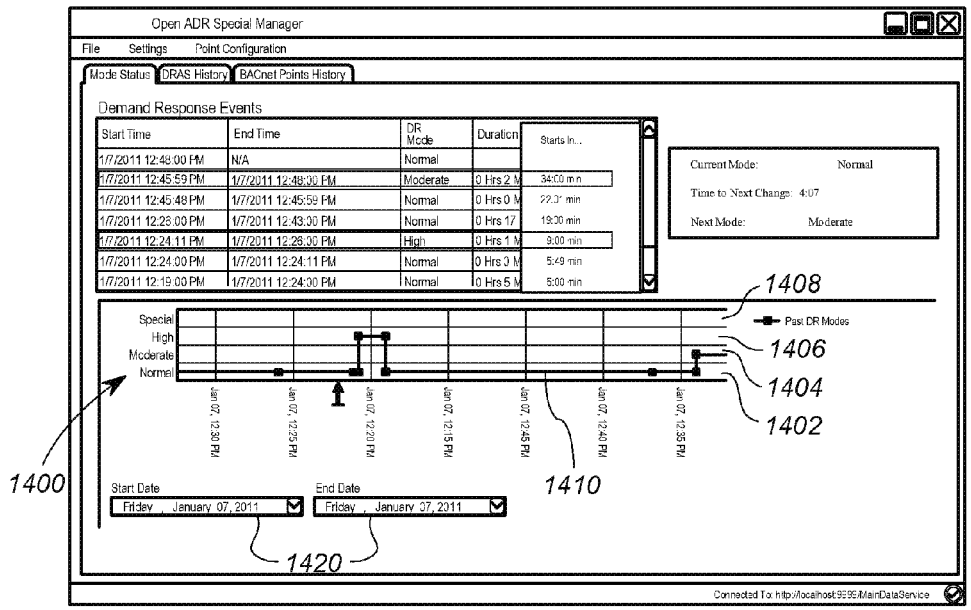
FIG. 14 shows a graphical user interface screen generated by the ADR client application of FIG. 5, wherein the screen provides a chart of the history of demand response events received by the automated demand response client of FIG. 5, including information on past, current and future DR events.

With reference now to FIGS. 5 and 14, the history module 118 of the ADR Application 100 provides the user with a history of all DR events via the ADR Client user interface 160. In the example of FIG. 14, the history of the DR events received by the ADR client 18 may be provided in the form of a color coded bar graph 1400 generated and displayed by the history module 118 via the ADR Client user interface 160 with time (by dates and time) on the x-axis and DR events (by mode) on the y-axis. The color coded bar graph includes a different color for each possible DR mode. In particular, a horizontal green stripe 1402 is provided for a "normal" mode (i.e., no DR event), a yellow horizontal stripe 1404 is provided for a "moderate" mode, a red horizontal stripe 1406 is provided for a "high" mode, and a purple horizontal stripe 1408 is provided for a "special" mode. This color coding arrangement provides the viewer with an easy way of readily determining the DR mode at various times on the chart. A line 1410 connects all points on the chart such that a bar-graph results. The line 1410 is typically in the normal mode stripe 1402, but extends above the normal mode stripe when a DR event occurred. The stripe the line extends to (i.e., 1404, 1406 or 1408) provides the viewer with a way to quickly and easily see what DR events occurred on different dates and times. The ADR Application 100 enables the viewer to modify the chart 1400 using the date range controls 1420 at the bottom of the chart 1400.

ADR Application Data Logging

Figure 15:
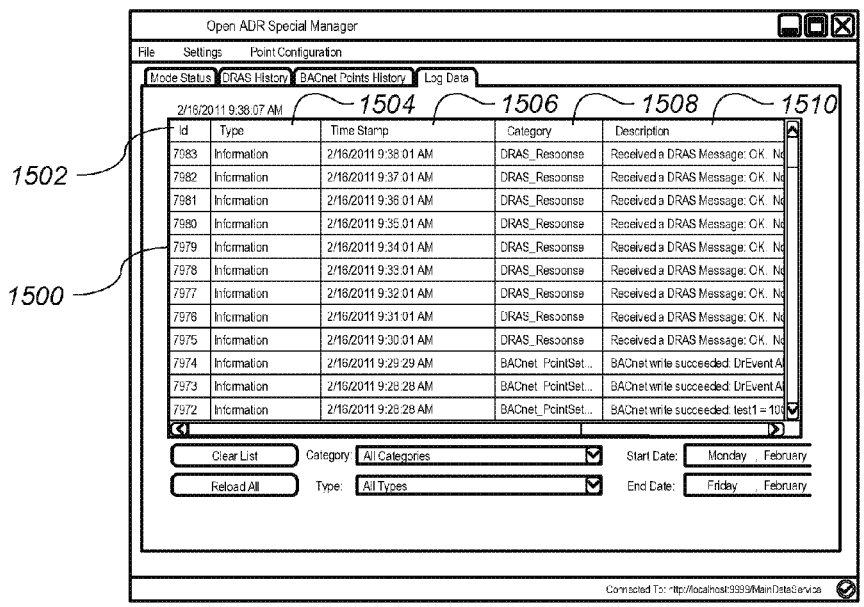
FIG. 15 shows a graphical user interface screen generated by the ADR client application of FIG. 5, wherein the screen provides a log of actions taken by the automated demand response client of FIG. 5.

With reference now to FIGS. 5 and 15, the logging component 124 of the ADR Application 100 provides the user with a log table 1500 of all actions taken by the ADR Client 18. This allows the operator to verify and review activity of the ADR application 100 as well as error detection. In the event of an error in the ADR application 100, the logging table 1500 provides valuable information that may be used to help determine the source of the error in the ADR client 18. In the example of FIG. 15, the log table 1500 includes a numerical list 1502 of actions taken, a type 1504 for each action, a time stamp 1506 for the action, a category 1508 for the action, and a general description of the action 1510.

Demand Response Monitoring on the Graphical User Interface

Figure 16:
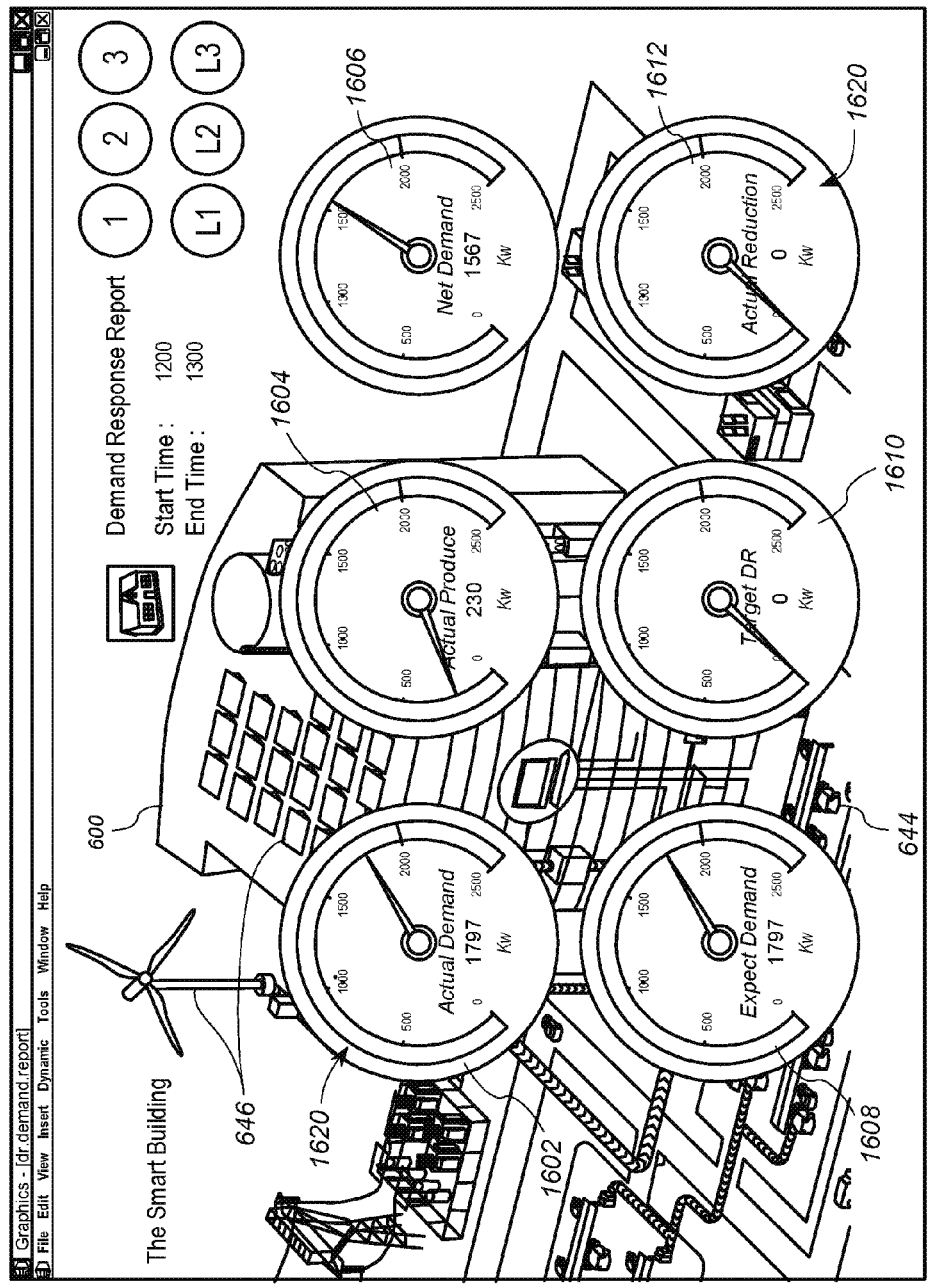
FIG. 16 shows a graphical user interface screen that can be developed to supplement the ADR client application of FIG. 5, wherein the screen provides a report of energy consumption during a demand reduction event.

With reference now to FIG. 16, in at least one embodiment of the ADR application 100, the user is provided with a graphical user interface that includes a graphical representation of the building 600 or facility associated with the ADR client 18. The graphical representation also includes a representation of all energy consuming points 644 in the building 600, as well as any energy producing points 646 associated with the building. In addition, the graphical user interface is configured to provide the user with a demand response report for each DR event. Each demand response report includes data related to a selected DR event, including total building demand 1602 during the DR event, actual energy production 1604 during the DR event, net building demand 1606 during the DR event, expected demand 1608 during the DR event, target demand reduction 1610 for the DR event, and actual DR reduction 1612 during the DR event. The demand response report information may be provided to the end user using any of various display methods. In the example of FIG. 16, the demand response report information is provided to the user using dial meters 1620. Each dial meter 1620 includes a green portion indicating that the data as measured is within an acceptable range, and a red portion indicating that the data as measured is outside of an acceptable range. The dial meters 1620 not only communicate information quickly and easily, but also provide an interesting visual display for the user, allowing the user to easily determine if a building's response to a particular DR event was acceptable.

The foregoing detailed description of one or more embodiments of the automated demand response system has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method of reducing an electrical load in a facility with a building automation system, the method comprising:
   receiving a demand response message related to a demand response event via a computer connected to a network, the demand response message identifying at least one demand response mode indicating at least a first level of load reduction for the demand response event;
   responsive to receiving the demand response message, automatically generating a schedule of a plurality of control actions for at least one device for execution in association with the demand response event, wherein automatically generating the schedule includes identifying the at least one device of the building automation system to be controlled during the demand response event based on an association between the at least one device and the first level of load reduction indicated by the at least one demand response mode for the demand response event; and
   sending control messages to the building automation system to execute the control actions for the at least one device according to the schedule of control actions for the demand response event.

2. The method of claim 1, further comprising:
storing in memory predefined relationships of control strategies for a plurality of devices of the building automation system for each of a plurality of levels of load reduction; and
wherein automatically generating the schedule of a plurality of control actions further comprises automatically generating the schedule based at least in part on the stored predefined relationships.

3. The method of claim 2, wherein the predefined relationships include an association between a first control strategy for the at least one device and the first level of load reduction, and an association between a second control strategy for the at least one device and a second level of load reduction of plurality of levels of load reduction.

4. The method of claim 1, wherein the demand response message includes identifies at least a first demand response mode indicating the first level of load reduction, and a second demand response mode indicating a second level of load reduction.

5. The method of claim 4, wherein:
the demand response message includes information identifying a first start time and first stop time for the first demand response mode, and a second start time and second stop time for the second demand response mode; and
wherein automatically generating the schedule of the plurality of control actions includes automatically generating the schedule of the plurality of control actions based on the first start time, the first stop time, the second start time, and the second stop time.

6. The method of claim 1, wherein the at least one demand response mode includes a first demand response mode and a second demand response mode, each specified in the demand response message and associated with a respective start and end time, the at least one device is a single device, the method further comprising:
prior to receiving the demand response message, associating the single device with a first of the control actions predefined to occur during a first control period starting after the end of the first demand response mode and with a second of the control actions predefined to occur during a second control period starting before the start of the second demand response mode; and
after receiving the demand response message, determining that the first control action conflicts with the second control action based on the first control period overlapping with the second control period.

7. The method of claim 6, further comprising:
prior to receiving the demand response message, associating each demand response mode with a plurality of time references, each combination of demand response mode and associated time reference being indicative of one of a plurality of demand response control periods, the first and second control periods each being one of the demand response control periods;
storing in memory a respective priority assigned to each combination of demand response mode and associated time reference; and
resolving the conflict between the first control action and the second control action based on the priority assigned to the combination of the first demand response mode and the associated time reference that is indicative of the first control period, and the priority assigned to the combination of the second demand response mode and the associated time reference that is indicative of the second control period.

8. The method of claim 1 wherein the demand response message is received from a demand response automated server at an automated demand response client associated with the building automation system.

9. The method of claim 8 wherein the at least one device includes a plurality of devices, and wherein the automated demand response client is configured to determine the plurality of devices of the building automation system to be controlled during the demand response event, prepare the schedule of control actions, and send control messages to the building automation system to execute the control actions.

10. A method of reducing an electrical load in a facility with a building automation system, the method comprising:
receiving a demand response message related to a demand response event via a computer connected to a network, the demand response message identifying at least one demand response mode indicating a start time and an end time for the at least one demand response mode for the demand response event;
automatically generating a schedule of a plurality of control actions for at least one device for execution in association with the demand response event, wherein the control actions in the schedule are associated with a plurality of demand response control periods, wherein the plurality of demand response control periods include a first demand response control period occurring before the start time of the at least one demand response mode, a second demand response control period occurring between the start time and the end time, and a third demand response control period occurring after the end time of the at least one demand response mode; and
sending control messages to the building automation system to execute the control actions for the at least one device according to the schedule of control actions for the demand response event.

11. The method of claim 10 wherein the first demand response control period occurs before the demand response event.

12. The method of claim 10 wherein the third demand response control period occurs after the demand response event.

13. The method of claim 10, wherein:
the at least one demand response mode includes a first demand response mode and a second demand response mode each specified in the demand response message; and
wherein automatically generating a schedule of a plurality of control actions includes scheduling control actions for the first demand response mode and the second demand response mode in at least the second demand response control period.

14. The method of claim 13 further comprising displaying on a graphical user interface a graph showing demand response events and a plurality of demand response modes associated with the demand response events during a selected period of time.

15. The method of claim 14 wherein the graph shows the demand response events and demand response modes as a step function graph, and wherein graph is color coded in association with the plurality of demand response modes.

16. A system for reducing the electrical load in a building, the system comprising:
a building automation system (BAS) including a plurality of field panels configured to deliver control instructions to a plurality of devices in the building;

at least one memory storing predefined relationships of control strategies for a plurality of devices of the building automation system for each of a plurality of demand response modes; and an automated demand response client configured to receive a message concerning a demand response event from an automated demand response server, the message including information concerning at least one demand response mode for the demand response event, the automated demand response client including, a scheduler component configured to generate a schedule of control actions for at least one device of the plurality of devices during the demand response event, wherein generation of the schedule of control actions is based at least in part on the at least one demand response mode and the predefined relationships stored in the at least one memory, and a BAS communications component configured to deliver the control actions of the schedule for the at least one device to the plurality of BAS field panels according to the schedule.

17. The system of claim 16 wherein the predefined relationships stored in the at least one memory include an association between a first control strategy for the at least one device and the first demand response mode, and an association between a second control strategy for the at least one device and a second demand response mode.

18. The system of claim 17 wherein each of the demand response modes corresponds to one of a plurality of load reduction levels for the building.

19. The system of claim 18 wherein:
the message includes information identifying at least a first demand response mode and a second demand response mode of the demand response event.

20. The system of claim 16 wherein:
the at least one demand response mode includes a first demand response mode and a second demand response mode each specified in the demand response message and associated with a respective start and end time;
the at least one device is a single device;
prior to receiving the demand response message, the automated demand response client is configured to associate the single device with a first of the control actions predefined to occur during a first control period starting after the end of the first demand response mode and with a second of the control actions predefined to occur during a second control period starting before the start of the second demand response mode; and
after receiving the demand response message, the automated demand response client is configured to determine that the first control action conflicts with the second control action based on the first control period overlapping with the second control period.

* * * * *